(12) United States Patent
Harada et al.

(10) Patent No.: US 8,491,994 B2
(45) Date of Patent: Jul. 23, 2013

(54) CONDUCTIVE RUBBER ELASTIC MATERIAL, CHARGING MEMBER AND ELECTROPHOTOGRAPHIC APPARATUS

(75) Inventors: Masaaki Harada, Yokohama (JP); Hiroaki Watanabe, Odawara (JP); Keiji Nose, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/471,338

(22) Filed: May 14, 2012

(65) Prior Publication Data

US 2012/0224887 A1 Sep. 6, 2012

Related U.S. Application Data

(63) Continuation of application No. PCT/JP2012/000092, filed on Jan. 10, 2012.

(30) Foreign Application Priority Data

Jan. 21, 2011 (JP) ................................. 2011-010891

(51) Int. Cl.
*B32B 5/16* (2006.01)
*B32B 27/32* (2006.01)
*H01B 1/06* (2006.01)
*G03G 15/02* (2006.01)

(52) U.S. Cl.
USPC ............ 428/323; 428/521; 252/511; 399/168

(58) Field of Classification Search
None
See application file for complete search history.

(56) References Cited

U.S. PATENT DOCUMENTS

| | | | |
|---|---|---|---|
| 4,647,625 A | | 3/1987 | Aonuma et al. |
| 6,673,407 B2 | | 1/2004 | Hara et al. |
| 6,697,587 B2 | | 2/2004 | Harada |
| 7,342,070 B2 | | 3/2008 | Tsukimawashi et al. |
| 7,366,448 B2 | * | 4/2008 | Taniguchi et al. ............ 399/176 |
| 7,486,911 B2 | | 2/2009 | Harada |
| 8,440,307 B2 | * | 5/2013 | Nose et al. .................... 428/421 |
| 2011/0176833 A1 | | 7/2011 | Harada et al. |
| 2012/0045250 A1 | | 2/2012 | Harada et al. |
| 2012/0076539 A1 | | 3/2012 | Sato et al. |
| 2012/0082852 A1 | | 4/2012 | Nose et al. |
| 2012/0141161 A1 | | 6/2012 | Watanabe et al. |
| 2012/0177408 A1 | | 7/2012 | Watanabe et al. |

FOREIGN PATENT DOCUMENTS

| | | |
|---|---|---|
| JP | 59-117514 A | 7/1984 |
| JP | 61-42552 A | 3/1986 |
| JP | 1-153740 A | 6/1989 |
| JP | 5-134515 A | 5/1993 |
| JP | 9-165470 A | 6/1997 |
| JP | 2001-254022 A | 9/2001 |
| JP | 2002-3651 A | 1/2002 |
| JP | 2003-171418 A | 6/2003 |

OTHER PUBLICATIONS

Nippon Gomu Kyokaishi (A Journal of the Society of Rubber Industry of Japan), vol. 62, No. 10, 1989, pp. 630-640 (paragraph 4.1, p. 635).
International Search Report dated Aug. 17, 2012 in International Application No. PCT/JP2012/000092.

* cited by examiner

*Primary Examiner* — Sheeba Ahmed
(74) *Attorney, Agent, or Firm* — Fitzpatrick, Cella, Harper & Scinto

(57) ABSTRACT

A conductive rubber elastic material is stably provided which can produce a charging member that may less vary in electrical resistance even with changes in applied voltage, promises uniform electrical properties, has charge characteristics not affected by changes in environments such as temperature and humidity, and enables a charging object member such as a photosensitive member to be kept from being contaminated. It is a conductive rubber elastic material which contains a matrix containing at least one ionically conductive rubber selected from the group consisting of epichlorohydrin rubber, epichlorohydrin-ethylene oxide rubber, epichlorohydrin-ethylene oxide-allyl glycidyl ether rubber, acrylonitrile-butadiene rubber and a hydrogenated product of acrylonitrile-butadiene rubber and domains composed of an electronically conductive rubber material containing i) a rubber having a butadiene skeleton and ii) carbon black, and the rubber having a butadiene skeleton is modified at a molecular terminal thereof with a specific atomic group.

6 Claims, 7 Drawing Sheets

CONDUCTIVE RUBBER ELASTIC MATERIAL, CHARGING MEMBER AND ELECTROPHOTOGRAPHIC APPARATUS

CROSS-REFERENCE TO RELATED APPLICATIONS

This application is a continuation of International Application No. PCT/JP2012/000092, filed Jan. 10, 2012, which claims the benefit of Japanese Patent Application No. 2011-010891, filed Jan. 21, 2011.

BACKGROUND OF THE INVENTION

1. Field of the Invention

This invention relates to a conductive rubber elastic material, a charging member and an electrophotographic apparatus.

2. Description of the Related Art

In order that an elastic-material layer of a charging member (roller) used in a contact charging system may be provided with an electrical conductivity of approximately from $1\times10^3$ to $1\times10^7$ Ω·cm in volume resistivity, it is known that the elastic-material layer is formed by using an electronic conduction type conductive rubber composition compounded with conductive particles such as carbon black. However, such an elastic-material layer has, as stated in Japanese Patent Application Laid-open No. 2002-3651, a problem that its electrical resistance depends so strongly on the state of dispersion of the conductive particles as to tend to cause resistance non-uniformity in the roller.

In addition, electric charges present between the conductive particles change in their readiness of conduction that is due to electric-field effect, depending on applied voltage. Hence, the value of electrical resistance depends greatly on the voltage. Also, in ionic conductive materials, the mobility of ions changes depending on environmental temperature, humidity and so forth. Hence, the value of electrical resistance depends greatly on environments. Thus, both electronic conduction types and ionic conduction types have a problem in the stability of charging performance.

To cope with such a problem, proposed in Japanese Patent Application Laid-open No. 2002-3651 are, as a semiconductive rubber composition the electrical resistance value of which is settable with ease and is less dependent on voltage and less variable by environments, a semiconductive rubber composition having a matrix-domain structure containing a matrix composed of an ionically conductive rubber material and domains composed of an electronically conductive rubber material, and also a charging member making use of the same.

SUMMARY OF THE INVENTION

The present inventors have confirmed that the invention according to Japanese Patent Application Laid-open No. 2002-3651 is effective in resolving the above problem. However, they have realized that further technical development must be made in order to make the electrical resistance of the charging member much more low dependent on voltage and surrounding environments.

Accordingly, the present invention is directed to providing a conductive rubber elastic material suited for a conductive elastic-material layer of a charging member that can not easily change in electrical resistance even with any changes in applied voltage and surrounding environments and has a stable charging performance.

The present invention is also directed to providing a charging member that can not easily change in electrical resistance even with any variations in applied voltage and surrounding environments.

The present invention is further directed to providing an electrophotographic apparatus that can form high-grade electrophotographic images stably.

According to one aspect of the present invention, there is provided a conductive rubber elastic material comprising; a matrix containing at least one ionically conductive rubber selected from the group consisting of epichlorohydrin rubber, epichlorohydrin-ethylene oxide rubber, epichlorohydrin-ethylene oxide-allyl glycidyl ether rubber, acrylonitrile-butadiene rubber and a hydrogenated product of acrylonitrile-butadiene rubber, and domains composed of an electronically conductive rubber material containing i) a rubber having a butadiene skeleton and ii) carbon black, where, the rubber having a butadiene skeleton is modified at a molecular terminal thereof with at least one atomic group selected from the group consisting of atomic groups represented by the following formula (1) to (6).

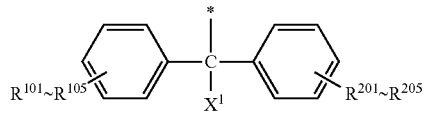

Formula (1)

In the formula (1), an asterisk * represents the position of bonding with a terminal carbon atom the rubber having a butadiene skeleton has, $X^1$ represents OH or SH, and $R^{101}$ to $R^{105}$ and $R^{201}$ to $R^{205}$ each independently represent a hydrogen atom or a monovalent substituent.

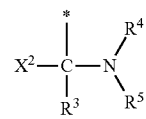

Formula (2)

In the formula (2), an asterisk * represents the position of bonding with a terminal carbon atom the rubber having a butadiene skeleton has, $X^2$ represents OH or SH, $R^4$ represents a hydrogen atom or a monovalent substituent, and $R^3$ and $R^5$ each independently represent a hydrogen atom or a monovalent substituent.

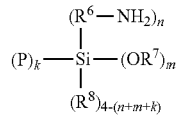

Formula (3)

In the formula (3), P represents the main chain of the rubber having a butadiene skeleton; $R^6$ is an alkylene group having 1 to 12 carbon atom(s); $R^7$ and $R^8$ are each independently an alkyl group having 1 to 20 carbon atom(s); and n is an integer of 1 or 2, m is an integer of 1 or 2 and k is an integer of 1 or 2, provided that n+m+k is an integer of 3 or 4.

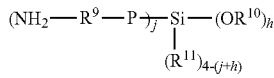

Formula (4)

In the formula (4), P represents the main chain of the rubber having a butadiene skeleton, $R^9$ is an alkylene group having 1 to 12 carbon atom(s); $R^{10}$ and $R^{11}$ are each independently an alkyl group having 1 to 20 carbon atom(s); and j is an integer of 1 to 3 and h is an integer of 1 to 3, provided that j+h is an integer of 2 to 4.

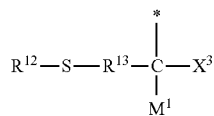

Formula (5)

In the formula (5), an asterisk * represents the position of bonding with a terminal carbon atom the rubber having a butadiene skeleton has, $R^{12}$ represents an alkyl group having 1 to 18 carbon atom(s), $R^{13}$ represents an alkylene group having 1 to 6 carbon atom(s), $X^3$ represents OH or SH, and $M^1$ represents an alkyl group having 1 to 18 carbon atom(s) or an alkoxyl group having 1 to 18 carbon atom(s).

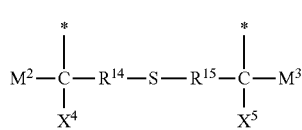

Formula (6)

In the formula (6), asterisks *'s each represent the position of bonding with a terminal carbon atom the rubber having a butadiene skeleton has, $R^{14}$ and $R^{15}$ each independently represent an alkylene group having 1 to 6 carbon atom(s), $X^4$ and $X^5$ each independently represent OH or SH, and $M^2$ and $M^3$ each independently represent an alkyl group having 1 to 18 carbon atom(s) or an alkoxyl group having 1 to 18 carbon atom(s).

According to another aspect of the present invention, there is provided a charging member comprising an electrically conductive support and an elastic-material layer; wherein the elastic-material layer comprises the conductive rubber elastic material described above.

According to further aspect of the present invention, there is provided an electrophotographic apparatus comprising the above charging member and an electrophotographic photosensitive member to be electrostatically charged by the charging member.

According to the present invention, a conductive rubber elastic material can be obtained the electrical resistance of which has small dependence on applied voltage and surrounding environments (such as temperature and humidity).

According to the present invention, a charging member can be obtained that can not easily change in charging performance even with any changes in applied voltage and environmental temperature and humidity to have a stable charging performance.

According to the present invention, an electrophotographic apparatus can further be obtained that can form high-grade electrophotographic images stably.

Further features of the present invention will become apparent from the following description of exemplary embodiments with reference to the attached drawings.

DESCRIPTION OF THE EMBODIMENTS

The present inventors have made studies on how to prevent an electronic conduction agent of domains from moving to a matrix in rubber compositions having the matrix-domain structure containing a matrix composed of an ionically conductive rubber material and domains composed of an electronically conductive rubber material.

Then, they have come to the conclusion that the problem can be resolved by bringing the electronic conduction agent of domains and a binder polymer into specific combination.

More specifically, the conduction agent of domains is assigned to carbon black and a terminal-modified polymer that forms a bond with the carbon black is used as the binder polymer that forms the domains. This enables the conduction agent carbon black to be fastened to the domains and prevented from moving to the matrix, and enables a conductive rubber elastic material to be obtained which is uniform in electrical properties and the electrical resistance of which is less dependent on voltage and less dependent on environments, as so discovered. The present invention is based on such a finding.

Preferred embodiments of the present invention are described below. In the following, particularly as an example of the conductive rubber elastic material, a conductive rubber elastic material is described which is used to form an elastic-material layer of a roller-shaped charging member (hereinafter also "charging roller"). The use of the conductive rubber elastic material according to the present invention is by no means limited to the elastic-material layer only.

Figure 2:
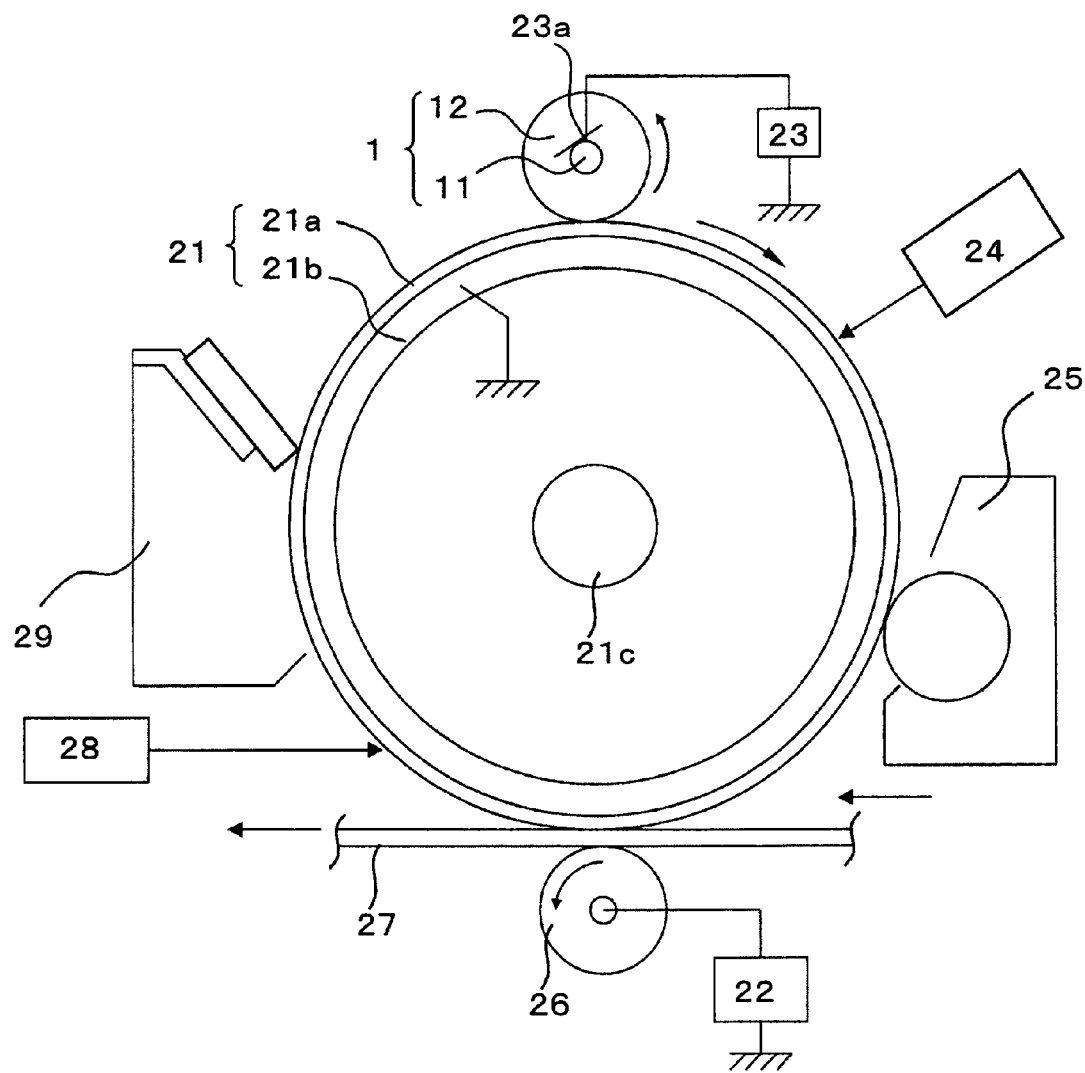
FIG. 2 is a schematic view showing the construction of an electrophotographic apparatus having a charging member.

FIG. 2 schematically shows the construction of an electrophotographic apparatus. A drum-shaped electrophotographic photosensitive member 21 shown in FIG. 2 which serves as a charging object member has, as basic constituent layers, a support 21b having electrical conductivity, made of aluminum or the like and, formed on the support 21b, a photosensitive layer 21a. It is rotatingly driven around a shaft 21c in the clockwise direction as viewed on FIG. 2, and at a stated peripheral speed.

A charging roller 1 is a roller which is disposed in contact with the electrophotographic photosensitive member 21 and charges (primarily charges) the electrophotographic photosensitive member 21 to a stated polarity and potential. The charging roller 1 consists basically of a mandrel 11 and an elastic-material layer 12 formed on the mandrel 11. It is kept pressed against the electrophotographic photosensitive member 21 under application of pressure at both end portions of the mandrel 11 by means of a press-down means (not shown), and is follow-up rotated as the electrophotographic photosensitive member 21 is rotatingly driven.

A stated direct-current (DC) bias is applied to the mandrel 11 through a rubbing-friction electrode 23a connected to a power source 23, whereupon the electrophotographic photosensitive member 21 is contact-charged to a stated polarity and potential. The electrophotographic photosensitive member 21 the peripheral surface of which has uniformly been charged by means of the charging roller 1 is subsequently subjected to exposure (e.g., laser beam scanning exposure, or slit exposure of images of an original) of intended image information by means of an exposure means 24, whereupon electrostatic latent images corresponding to the intended image information are formed on the peripheral surface of the electrophotographic photosensitive member 21.

The electrostatic latent images thus formed are then successively made into visible images as toner images by a developing means 25. The toner images thus formed are then successively transferred by a transfer means 26 to a transfer material 27 such as paper, having been transported from a paper feed means section (not shown) to a transfer zone between the electrophotographic photosensitive member 21 and the transfer means 26 at proper timing in the manner synchronized with the rotation of the electrophotographic photosensitive member 21. The transfer means 26 shown in FIG. 2 is a transfer roller connected to a power source 22, which roller is charged to a polarity reverse to that of toner from the back of the transfer material 27, whereupon the toner images on the side of the electrophotographic photosensitive member 21 are transferred on to the transfer material 27.

The transfer material 27 to which the toner images have been transferred is separated from the electrophotographic photosensitive member 21 and then transported to a fixing means (not shown), where the toner images are fixed. The transfer material with fixed images is put out as an image-formed matter. Instead, where images are to be also formed on the back, the transfer material with fixed images is transported to a means for re-transporting it to the transfer zone.

The peripheral surface of the electrophotographic photosensitive member 21 from which the toner images have been transferred is subjected to pre-exposure by a pre-exposure means 28, whereby electric charges remaining on the electrophotographic photosensitive member 21 are removed (destaticized). As this pre-exposure means 28, any known means may be used, which may preferably be exemplified by an LED chip array, a fuse lamp, a halogen lamp and a fluorescent lamp.

The peripheral surface of the electrophotographic photosensitive member 21 thus destaticized is cleaned by a cleaning means 29 to remove any adherent contaminants such as transfer residual toner. Its surface having been thus cleaned is repeatedly used for image formation.

The charging roller 1 may be follow-up driven to the electrophotographic photosensitive member 21 which is driven with surface movement, or may be set unrotatable, or may positively rotatingly be driven at a stated peripheral speed in the forward direction or backward direction with respect to the direction of the surface movement of the electrophotographic photosensitive member 21.

The exposure is performed using light reflected from, or transmitted through, an original, or by the scanning of a laser beam, the driving of an LED array or the driving of a liquid crystal shutter array according to signals obtained by reading an original and converting the information into signals.

The electrophotographic apparatus in which the conductive rubber elastic material of the present invention is usable may include copying machines, laser beam printers and LED printers, or apparatus where electrophotography is applied, such as electrophotographic platemaking systems.

The conductive rubber elastic material of the present invention may be used as, besides the elastic-material layer of the charging roller, any of elastic members for a developing member, a transfer member, a charge elimination (destaticizing) member and a transport member such as a paper feed roller.

Figure 1:
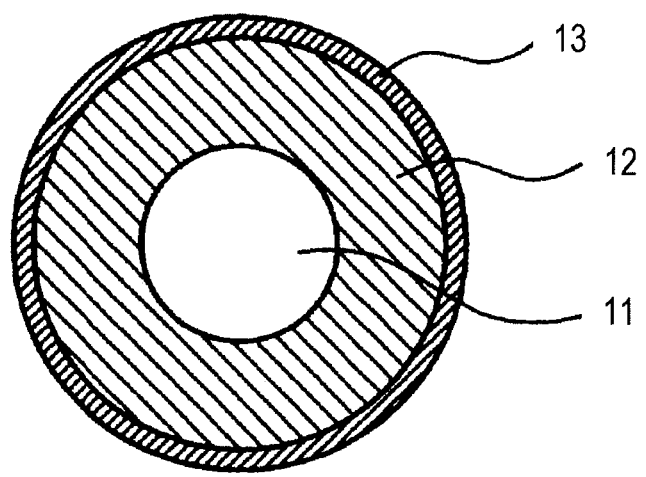
FIG. 1 is a diagrammatic sectional view showing the construction of a charging roller.

A diagrammatic sectional view of a charging roller 1 is shown in FIG. 1, as an example in which the conductive rubber elastic material of the present invention is used. The charging roller 1 is constituted of a mandrel and provided on its peripheral surface an elastic-material layer 12. A surface layer 13 may also optionally be provided on the outer side of the elastic-material layer 12.

Figure 3:
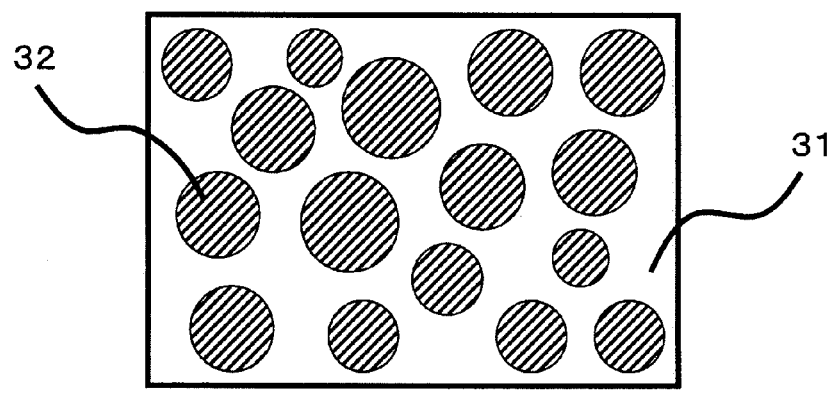
FIG. 3 is a diagrammatic view showing a rubber composition having a matrix-domain structure.

The elastic-material layer constructs as shown in FIG. 3 a matrix-domain structure consisting of a matrix 31 formed of an ionically conductive rubber and domains 32 formed of an electronically conductive rubber material. Making the ionically conductive rubber serve as the matrix makes the charging roller achieve uniformity of its electrical resistance and reduction of its voltage dependence.

The electrical resistance of the conductive rubber elastic material can be changed by changing the blending proportion of the ionically conductive rubber that forms the matrix and the electronically conductive rubber material that forms the domains, to change the proportion of presence of the domains. Hence, the electrical resistance of the resultant conductive rubber elastic material can readily be made to have the desired value.

The ionically conductive rubber that forms the matrix has electrical resistance greatly variable by environments. However, the electrical resistance of the conductive rubber elastic material is determined by the proportion of presence of the domains, which are of low electrical resistance, and hence this enables the electrical resistance of the elastic-material layer to be less variable by environments.

The ionically conductive rubber in the present invention is a rubber the volume resistivity of which comes to $1 \times 10^{12}$ $\Omega \cdot cm$ or less in an environment of temperature 23° C./humidity 50% RH, in the state that it does not contain any conductive particles describe later. The rubber the volume resistivity of which comes to $1 \times 10^{12}$ $\Omega \cdot cm$ or less may include, e.g., epichlorohydrin rubber, epichlorohydrin-ethylene oxide rubber, epichlorohydrin-ethylene oxide-allyl glycidyl ether rubber, acrylonitrile-butadiene rubber and a hydrogenated product of acrylonitrile-butadiene rubber. As the ionically conductive rubber according to the present invention, it is what contains at least one of these rubbers.

The above ionically conductive rubber may also be compounded with an ionic conduction agent to such an extent as not to bleed out. Such an ionic conduction agent may be exemplified by inorganic ionic substances such as lithium perchlorate, sodium perchlorate and calcium perchlorate; cationic surface-active agents such as lauryl trimethylammonium chloride, stearyl trimethylammonium chloride, octadecyl trimethylammonium chloride, dodecyl trimethylammonium chloride, hexadecyl trimethylammonium chloride, trioctyl propylammonium bromide, and modified aliphatic dimethyl ethylammonium ethosulfate; amphoteric ionic surface-active agents such as lauryl betaine, stearyl betaine, and dimethylalkyl lauryl betaine; quaternary ammonium salts such as tetraethylammonium perchlorate, tetrabutylammonium perchlorate and trimethyloctadecylammonium perchlorate; and organic-acid lithium salts such as lithium trifluoromethane sulfonate.

The ionic conduction agent as described above may be compounded in an amount of, e.g., from 0.5 part by mass or more to 5.0 parts by mass or less, based on 100 parts by mass of the ionically conductive rubber.

The ionically conductive rubber thus prepared has a volume resistivity of, e.g., $1 \times 10^{12}$ Ω·cm or less, and preferably $1 \times 10^{10}$ Ω·cm or less. As to the volume resistivity of the conductive rubber elastic material having a matrix-domain structure, the electrical properties of the matrix show a tendency to contribute more greatly to the electrical properties of the whole conductive rubber elastic material than the electrical properties of the domains. Hence, as long as the matrix has a volume resistivity of $1 \times 10^{10}$ Ω·cm or less, a conductive rubber elastic material having volume resistivity in a medium-resistance region can be produced with ease. Also, as long as the matrix has a volume resistivity of $1 \times 10^{10}$ Ω·cm or less, it results in a low electrical resistance, and hence it is unnecessary to enlarge the proportion of the domains.

In general, in the case of a non-compatible type polymer blend, its matrix-domain structure shows, though depending on viscosity of each polymer and blending conditions, a tendency that a polymer in a large compositional ratio serves to be the matrix. Accordingly, as described above, the ionically conductive rubber having a volume resistivity of $1 \times 10^{10}$ Ω·cm or less may be used, and this enables the electronically conductive rubber material to be blended in a small proportion, and can make the domains low in proportion. As the result, this enables formation of stable domains, and makes stable the matrix-domain structure of the whole conductive rubber elastic material.

The domains are composed of the electronically conductive rubber material. The electronically conductive rubber material is a material the electrical resistance of which has been controlled by dispersing conductive particles such as carbon black or conductive zinc oxide in a binder polymer which does not show any electrical conductivity in itself.

The matrix-domain structure is formed by blending the electronically conductive rubber material and the ionically conductive rubber in a stated proportion. The ionically conductive rubber is a polar rubber, and usually has a solubility parameter (SP value) of 17.8 $(MPa)^{1/2}$ or more. In general, where two types of rubbers are blended, though depending on blending conditions and so forth, they come more strongly non-compatible with each other as the respective rubbers differ more greatly in their SP values, where the matrix-domain structure is stably formed. Accordingly, it is preferable for the binder polymer constituting the electronically conductive rubber material to be a non-polar rubber having an SP value of less than 17.8 $(MPa)^{1/2}$. In particular, it is preferable that the difference in SP value between the ionically conductive rubber that forms the matrix and the binder polymer that forms the domains is 1.0 $(MPa)^{1/2}$ or more. This is because a stable matrix-domain structure can be materialized.

The SP value in the present invention may be found by bibliographic values, or by using Small's calculation method, which calculates it from the molar attraction constants of molecule-constituting atomic groups on the basis of molecular structure, or may be experimentally determined by the viscosity method, the swelling method, gas chromatography or the like.

In the present invention, substantially only the domains are kept to have been made electrically conductive by the conductive particles, which conductive particles stand localized in the domains.

Here, in general, where a blend of two types of polymers is compounded with conductive particles such as conductive carbon black, such a blend usually shows, though depending on viscosity of each polymer and affinity for the conductive particles, a tendency that the conductive particles localize in a polymer having a large SP value. Hence, in employing a method in which a rubber blend prepared by blending a binder polymer that forms domains and an ionically conductive rubber that forms a matrix is mixed with conductive particles and in employing a method in which an ionically conductive rubber, a binder polymer and conductive particles are blended altogether, the conductive particles tend to localize in the ionically conductive rubber having a large SP value.

However, in the present invention, the conductive particles must be made to localize in the domains containing the binder polymer having a small SP value. For this end, a method is effective in which a master batch is prepared by beforehand adding the conductive particles to only the binder polymer and thereafter a rubber blend prepared by blending the master batch obtained and the ionically conductive rubber is used to produce the conductive rubber elastic material.

However, even where such a master batch method is employed, a phenomenon may be seen in which some of the conductive particles move to the matrix containing the ionically conductive rubber, which has a high affinity. In this case, a phenomenon is seen in which the electrical resistance comes greatly dependent on voltage.

To hold down this, in the present invention, the conductive particles to be compounded in the binder polymer are assigned to carbon black and the binder polymer contains a rubber having been terminal-modified with an atomic group that forms a bond with the carbon black.

In the course that such a master batch is prepared in which the rubber having been thus terminal-modified has beforehand been mixed with the carbon black, terminal-modified groups of the rubber combine firmly with the carbon black, so that carbon black particle surfaces come embraced with the rubber having been terminal-modified. This can keep the carbon black from moving to the matrix even thereafter the resultant electronically conductive rubber material is blended with the ionically conductive rubber.

The rubber having a butadiene skeleton and having been modified at its terminal may be produced by a method which may include, e.g., the following:

(a) A method in which the rubber having a butadiene skeleton is synthesized in the presence of an alkali metal and/or alkaline earth metal catalyst(s), and thereafter a modifying agent is added to the resultant polymer solution to carry out reaction.

(b) A method in which the rubber having a butadiene skeleton that has beforehand been formed by polymerization is dissolved in a solvent, and thereafter an alkali metal and/or alkaline earth metal catalyst(s) is/are added to the rubber thus dissolved, where a modifying agent is added thereto to carry out reaction.

The former method (a) is preferred because the synthesis of the rubber having a butadiene skeleton and the modification of its terminal can continuously be carried out.

The rubber having a butadiene skeleton that is to be modified at its terminal may include, e.g., polybutadiene obtained by polymerizing a 1,3-butadiene monomer, and copolymers of any of 1,3-butadiene, isoprene, 1,3-pentadiene, 2,3-dimethyl-1,3-butadiene, 1,3-hexadiene, styrene, α-methylstyrene, p-methylstyrene, vinyltoluene, vinylnaphthalene and so forth. Such a rubber (polymer), as having the butadiene skeleton in its main chain, can be vulcanized with sulfur, and hence a charging member is obtained which can enjoy a high vulcanization productivity. As a preferred rubber having the butadiene skeleton, it is, e.g., polybutadiene rubber or styrene-butadiene rubber.

The rubber having a butadiene skeleton stands modified at its molecular terminal with any of atomic groups represented by the following formula (1) to (6).

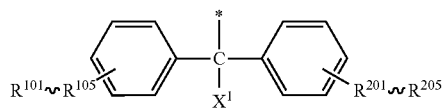

Formula (1)

In the formula (1), an asterisk * represents the position of bonding with a terminal carbon atom the rubber having a butadiene skeleton has, $X^1$ represents OH or SH, and $R^{101}$ to $R^{105}$ and $R^{201}$ to $R^{205}$ each independently represent a hydrogen atom or a monovalent substituent.

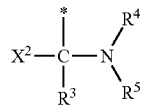

Formula (2)

In the formula (2), an asterisk * represents the position of bonding with a terminal carbon atom the rubber having a butadiene skeleton has, $X^2$ represents OH or SH, $R^4$ represents a hydrogen atom or a monovalent substituent, and $R^3$ and $R^5$ represent hydrocarbon chains necessary to combine with each other to form a nitrogen-containing 4- to 6-membered ring together with the carbon atom and nitrogen atom in the formula-(2) atomic group or each independently represent a hydrogen atom or a monovalent substituent.

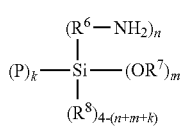

Formula (3)

In the formula (3), P represents the main chain of the rubber having a butadiene skeleton; $R^6$ is an alkylene group having 1 to 12 carbon atom(s); $R^7$ and $R^8$ are each independently an alkyl group having 1 to 20 carbon atom(s); and n is an integer of 1 or 2, m is an integer of 1 or 2 and k is an integer of 1 or 2, provided that n+m+k is an integer of 3 or 4.

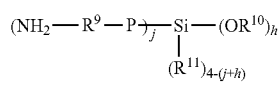

Formula (4)

In the formula (4), P represents the main chain of the rubber having a butadiene skeleton, $R^9$ is an alkylene group having 1 to 12 carbon atom(s); $R^{10}$ and $R^{11}$ are each independently an alkyl group having 1 to 20 carbon atom(s); and j is an integer of 1 to 3 and h is an integer of 1 to 3, provided that j+h is an integer of 2 to 4.

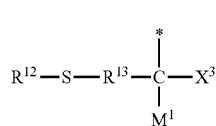

Formula (5)

In the formula (5), an asterisk * represents the position of bonding with a terminal carbon atom the rubber having a butadiene skeleton has, $R^{12}$ represents an alkyl group having 1 to 18 carbon atom(s), $R^{13}$ represents an alkylene group having 1 to 6 carbon atom(s), $X^3$ represents OH or SH, and $M^1$ represents an alkyl group having 1 to 18 carbon atom(s) or an alkoxyl group having 1 to 18 carbon atom(s).

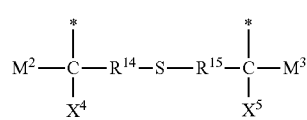

Formula (6)

In the formula (6), asterisks *'s each represent the position of bonding with a terminal carbon atom the rubber having a butadiene skeleton has, $R^{14}$ and $R^{15}$ each independently represent an alkylene group having 1 to 6 carbon atom(s), $X^4$ and $X^5$ each independently represent OH or SH, and $M^2$ and $M^3$ each independently represent an alkyl group having 1 to 18 carbon atom(s) or an alkoxyl group having 1 to 18 carbon atom(s).

Specific examples of a terminal-modifying agent with which the formula-(1) atomic group is introduced to the molecular terminal are given below:

4-Aminobenzophenone, 4-dimethylaminobenzophenone, 4-dimethylamino-4'-methylbenzophenone, 4,4'-diaminobenzophenone, 4,4'-bis(dimethylamino)benzophenone, 4,4'-bis(diethylamino)benzophenone, 4,4'-bis(ethylamino)benzophenone, 3,3'-dimethyl-4,4'-bis(diethylamino) benzophenone, 3,3'-dimethoxy-4,4'-bis(dimethylamino) benzophenone, 3,3',5,5'-tetraminobenzophenone, 2,4,6-triaminobenzophenone, 3,3',5,5'-tetra(diethylamino) benzophenone, and thiobenzophenones corresponding to these.

Specific examples of a terminal-modifying agent with which the formula-(2) atomic group is introduced to the molecular terminal are given below:

Amides or imides (e.g., formamide, N,N-dimethyl formamide, N,N-diethyl formamide, acetamide, N,N-dimethyl acetamide, N,N-diethyl acetamide, aminoacetamide, N,N-dimethyl-N',N'-dimethyl aminoacetamide, N',N'-dimethyl acetamide, N'-ethyl aminoacetamide, N,N-dimethyl-N'-ethyl aminoacetamide, N,N-dimethyl aminoacetamide, N-phenyl diacetamide, acrylamide, N,N-dimethyl acrylamide, N,N-dimethyl methacrylamide, propionamide, N,N-dimethyl propionamide, 4-pyridylamide, N,N-dimethyl 4-pyridylamide, benzamide, N-ethyl benzamide, N-phenyl benzamide, N,N-dimethyl benzamide, p-aminobenzamide, N',N'-(p-dimethylamino)benzamide, N',N'-(p-diethylamino)benzamide, N'-(p-methylamino)benzamide, N'-(p-ethylamino)benzamide, N,N-dimethyl-N'-(p-ethylamino)benzamide, N,N-dimethyl-N',N'-(p-diethylamino)benzamide, N,N-dimethyl-p-aminobenzamide, N-methyldibenzamide, N-acetyl-N-2-naphthyl benzamide, succinic acid amide, maleic acid amide, phthalic acid amide, N,N,N',N'-tetramethylmaleic acid amide, N,N,N',N'-tetramethylphthalic acid amide, succinimide, N-methyl succinimide, maleimide, N-methyl maleimide, phthalimide, N-methyl phthalimide, oxamide, N,N,N',N'-tetramethyl oxamide, N,N-dimethyl-p-amino-benzal acetamide, nicotinamide, N,N-diethyl nicotinamide, 1,2-cyclohexane dicarboximide, N-methyl-1,2-cyclohexane dicarboximide, methyl carbamate, N-methyl methyl carbamate, N,N-diethyl ethyl carbanylate, and p-N,N-diethyl ethyl aminocarbanylate); ureas (e.g., urea, N,N-dimethylurea, and N,N,N',N'-tetramethylurea); anilides (e.g., formanilide, N-methyl acetanilide, aminoacetanilide, benzanilide, and p,p'-di(N,N-diethyl)aminobenzanilide); lactams (e.g., N-methyl-β-propiolactam, N-phenyl-β-propiolactam, ε-caprolactam, N-methyl-ε-caprolactam, N-phenyl-ε-caprolactam, N-acetyl-ε-caprolactam, 2-pyyrolidone, N-methyl-2-pyyrolidone, N-acetyl-2-pyyrolidone, N-phenyl-2-pyyrolidone, N-t-butyl-2-pyyrolidone, 2-piperidone, N-methyl-2-piperidone, N-phenyl-2-piperidone, 2-quinolone, N-methyl-2-quinolone, 2-indolinone, and N-methyl-2-indolinone); and isocyanuric acids (e.g., isocyanuric acid, and N,N',N''-trimethylisocyanuric acid.

The terminal-modifying agent may also include sulfur-containing compounds corresponding to the above various compounds.

As a method by which the formula-(3) or formula-(4) atomic group is introduced to the molecular terminal, the intended modified product can be obtained by allowing a compound having a protected primary amino group and an alkoxysilyl group to react on the living polymerization terminal, followed by deprotection (hydrolysis).

Specific examples of the compound having a protected primary amino group and an alkoxysilyl group, which is to introduce the formula-(3) or -(4) atomic group to the polymerization terminal, are given below:

N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane and N,N-bis(trimethylsilyl)aminoethylmethyldiethoxysilane.

Figure 7:
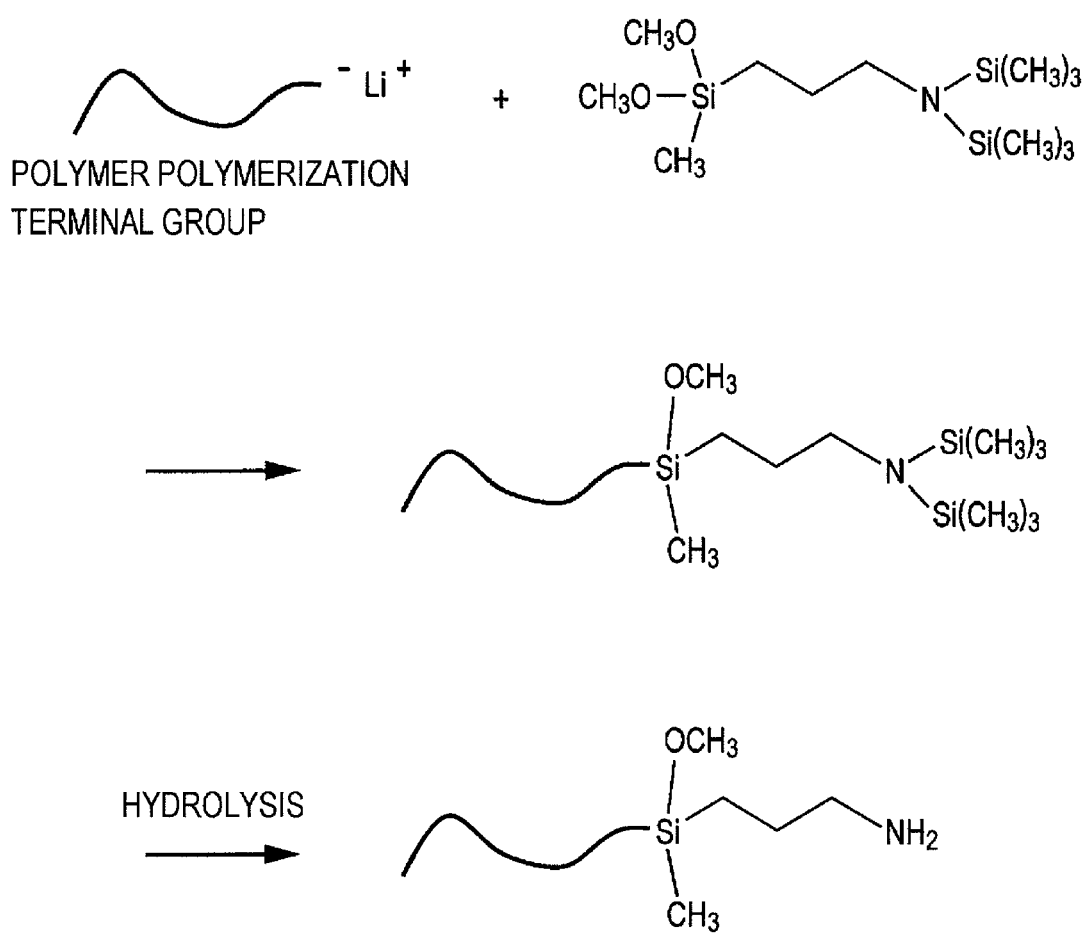
FIG. 7 is a scheme showing the reaction of a polymer polymerization terminal group with N,N-bis(trimethylsilyl)aminopropylmethyldimethoxysilane.
Figure 8:
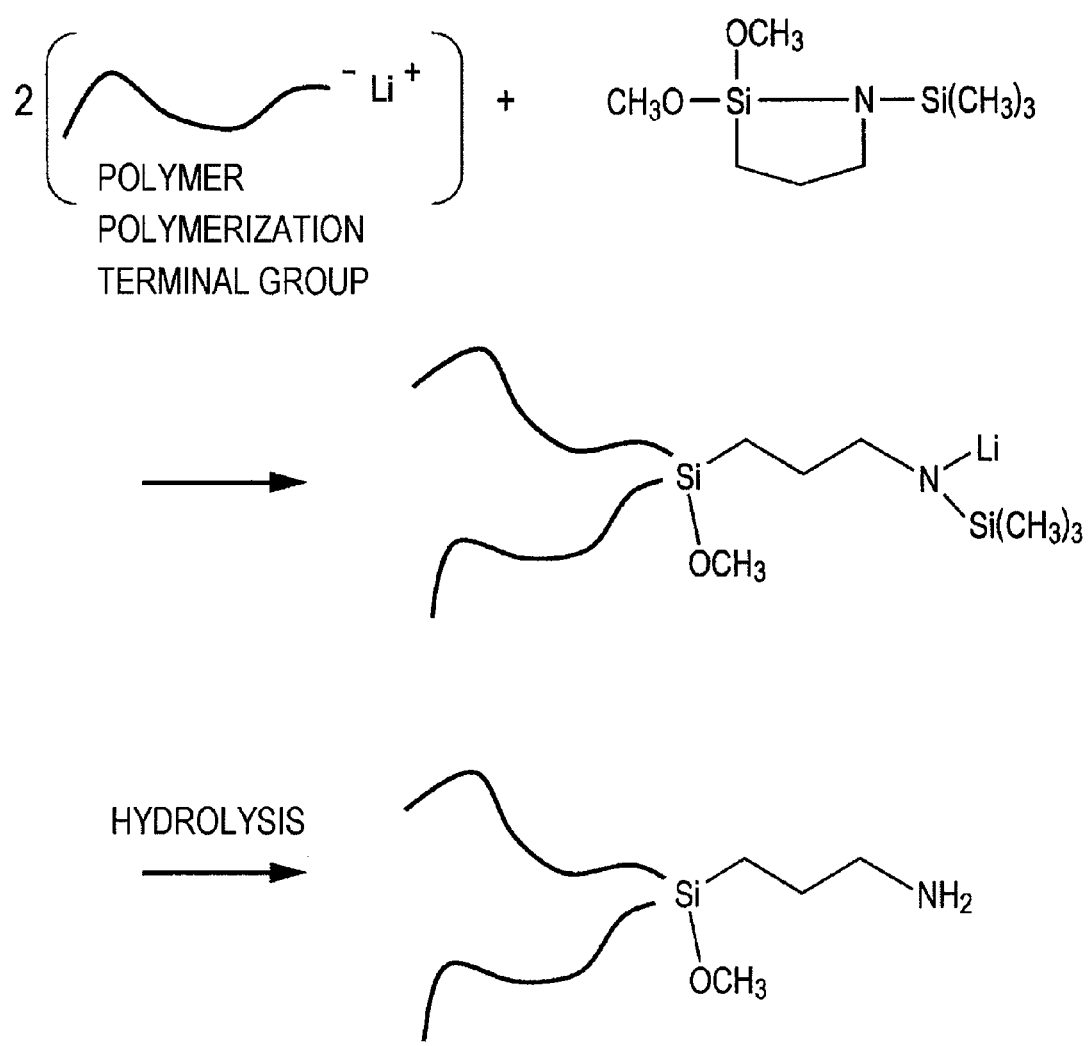
FIG. 8 is a scheme showing the reaction of a polymer polymerization terminal group with 1-trimethylsilyl-2,2-dimethoxy-1-aza-2-silacyclopentane.

In FIG. 7, shown is the reaction of a polymer polymerization terminal group with N,N-bis(trimethylsilyl)aminopropylmethyldimethoxysilane, and in FIG. 8 the reaction of a polymer polymerization terminal group with 1-trimethylsilyl-2,2-dimethoxy-1-aza-2-silacyclopentane. In the reaction with the silacyclopentane as shown in FIG. 8, there are as shown in the scheme a case in which it reacts with two-molecular polymer polymerization terminal group and a case in which it reacts with one-molecular polymer polymerization terminal group.

Specific examples of a terminal-modifying agent with which the formula-(5) atomic group is introduced to the molecular terminal are given below:

Methyl thioacetone, 2-octyl thioethyl benzyl ketone, 2-phenyl thioethyl phenyl ketone, p-lauryl thiobenzophenone, p-lauryl thioacetophenone, methyl (methylthio)acetate, methyl (methylthio)propionate, stearyl (methylthio) propionate, methyl (stearylthio)propionate, phenyl (stearylthio)propionate, benzyl (stearylthio)propionate, phenyl (octylthio)propionate, benzyl (laurylthio)propionate, hexyl (propylthio)propionate, phenyl (methylthio)propionate, benzyl (methylthio)propionate, hexyl (propylthio)propionate, lauryl (ethylthio)propionate, myristyl (octylthio) propionate, stearyl (laurylthio)propionate, stearyl (stearylthio) propionate, stearyl (benzylthio)propionate, stearyl (p-tolylthio)propionate, methyl (p-laurylthio)benzoate, methyl (o-laurylthio) benzoate, phenyl (p-laurylthio) benzoate, and ethyl (2-methylthio)butyrate.

Specific examples of a terminal-modifying agent with which the formula-(6) atomic group is introduced to the molecular terminal are given below:

Dimethyl 3,3'-thiodipropionate, dilauryl 3,3'-thiodipropionate, dimyristyl 3,3'-thiodipropionate, distearyl 3,3'-thiodipropionate, dimethyl 7,7'-thiodiheptanoate, and distearyl 7,7'-thiodiheptanoate.

In particular, the rubber having a butadiene skeleton according to the present invention may be one standing modified at its molecular terminal with an atomic group represented by the following formula (7) that is categorized into the formula (1) or the following formula (8) that is categorized into the formula (2), any of which may preferably be used.

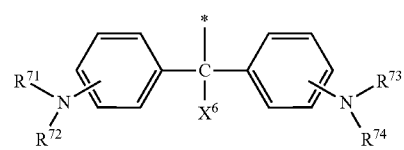

Formula (7)

In the formula (7), an asterisk * represents the position of bonding with a terminal carbon atom the rubber having a butadiene skeleton has, $R^{71}$ to $R^{74}$ each independently represent a hydrogen atom or an alkyl group having 1 to 4 carbon atom(s), and $X^6$ represents OH or SH.

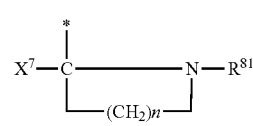

Formula (8)

In the formula (8), an asterisk * represents the position of bonding with a terminal carbon atom the rubber having a butadiene skeleton has; $X^7$ represents OH or SH, $R^{81}$ represents a hydrogen atom, an alkyl group having 1 to 6 carbon atom(s) or a phenyl group; and n represents an integer of 2 to 6.

As specific examples of a terminal-modifying agent with which the formula-(7) atomic group is introduced to the molecular terminal, it may include the following compounds.

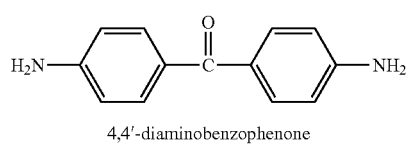

Formula (7-1)

4,4'-diaminobenzophenone

-continued

Formula (7-2)

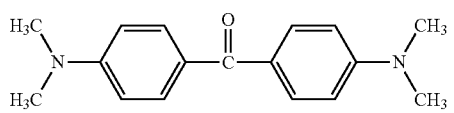

4,4'-bis(dimethylamino)benzophenone

Formula (7-3)

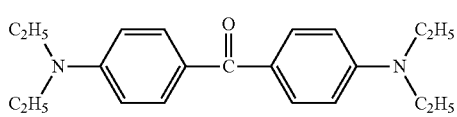

4,4'-bis(diethylamino)benzophenone

As specific examples of a terminal-modifying agent with which the formula-(8) atomic group is introduced to the molecular terminal, it may include the following compounds.

Formula (8-1)

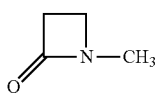

N-methyl-β-propiolactam

Formula (8-2)

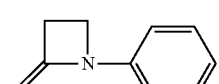

N-phenyl-β-propiolactam

Formula (8-3)

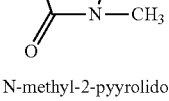

N-methyl-2-pyyrolidone

Formula (8-4)

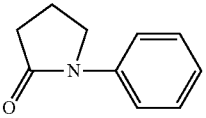

N-phenyl-2-pyyrolidone

Formula (8-5)

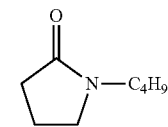

N-t-butyl-2-pyyrolidone

Formula (8-6)

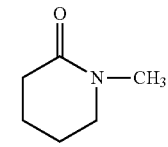

N-methyl-2-piperidone

Formula (8-7)

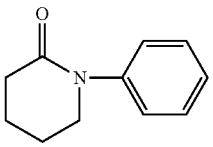

N-phenyl-2-piperidone

Formula (8-8)

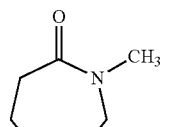

N-methyl-ε-caprolactam

Formula (8-9)

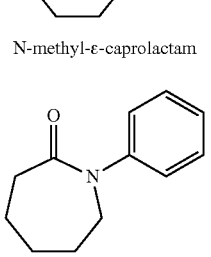

N-methyl-ε-caprolactam

Figure 5:
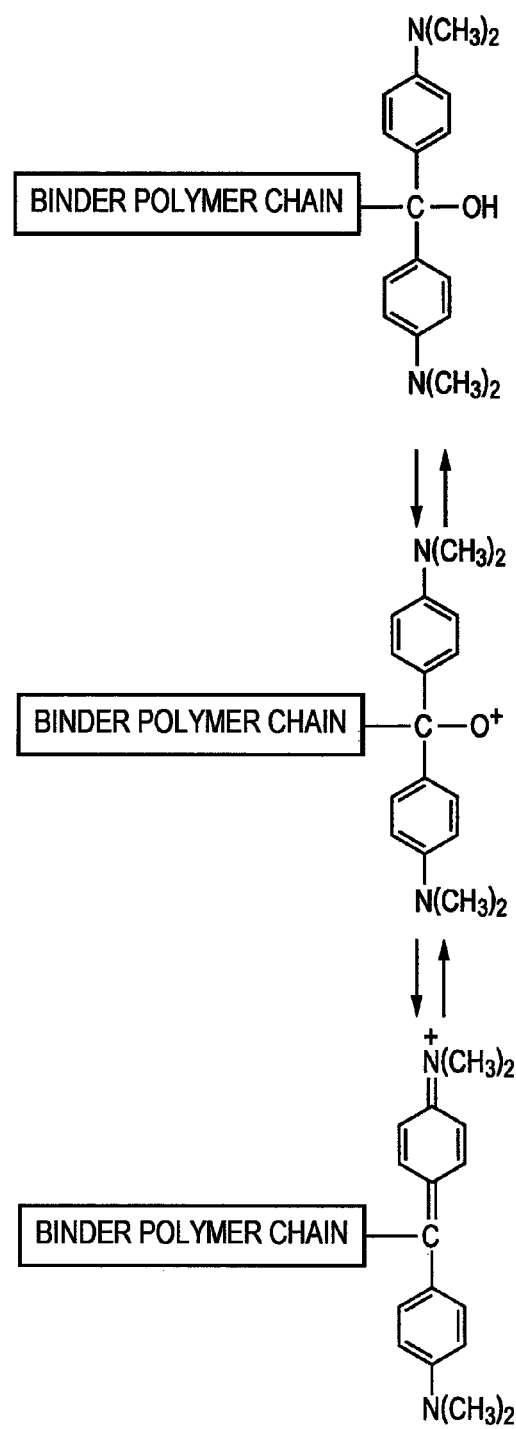
FIG. 5 is an illustration of the mechanism of forming a cation on a terminal-modified group derived from benzophenone.
Figure 6:
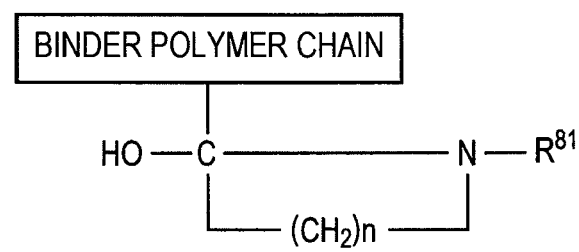
FIG. 6 is an illustration of the mechanism of forming a cation on a terminal-modified group derived from a lactam.
Figure 6:
Figure 6:
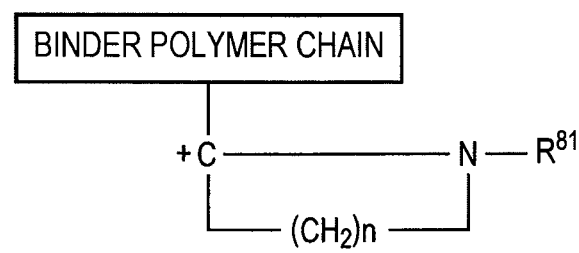
Figure 6:
Figure 6:
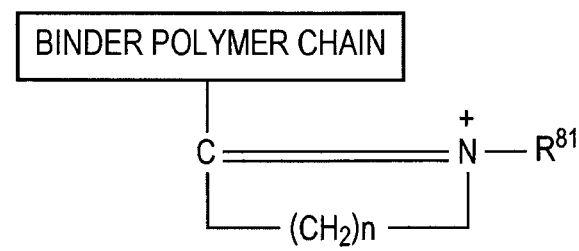

The polymer having a butadiene skeleton and having been modified at its molecular terminal with the atomic group represented by the formula (7) or (8) is considered to allow a cation (iminium ion) to come at the terminal functional group moiety (see FIGS. 5 and 6) on account of the heat or the like produced when it is kneaded together with the carbon black. It is presumed that the cation having thus come thereat combines with a functional group such as quinone, hydroxyl, ester, carboxyl or ether present on carbon black particle surfaces to form a linkage between the carbon black and the binder polymer. Then, this linkage makes stable the state of dispersion of the carbon black in the binder polymer. That the iminium ion having come at the terminal functional group moiety combines with a functional group present on carbon black particle surfaces is as described also in "GOMU KYO-KAISHI" (a journal of The Society of Rubber Industry, Japan), Volume 62, No. 10 (1989), page 635, paragraph 4.1.

Accordingly, in the domains of the conductive rubber elastic material according to the present invention, the carbon black and the rubber combine chemically firmly with each other, so that the carbon black is made stationary to the domains and by no means move to the matrix.

In the present invention, the lactams represented by the formulas (8-1) to (8-9) are particularly preferred. As a reason therefore, the present inventors consider it as stated below. That is, when the binder polymer having such a terminal-modified group derived from a lactam is kneaded together with the carbon black, a cation comes at the terminal-modified moiety. This is what has been shown in FIG. 5. Here, where any of the lactams represented by the formulas (8-1) to (8-9) is used as the terminal-modifying agent, the feature that a lower alkyl group having 1 to 3 carbon atom(s) or a phenyl group is bonded to the nitrogen atom has made the cation more easily come at the terminal functional group. Hence, the bonding with the carbon black has much more readily been formed, as so considered.

As types of the carbon black to be compounded in the domains, there are no particular limitations thereon. Stated specifically, it may include gas furnace black, oil furnace black, thermal black, lamp black, acetylene black, and KETJEN black. Functional groups are present on the particle surfaces of the carbon black, and such functional groups combine with any of the molecular-terminal functional groups represented by the formulas (1) to (8), whereby the linkage between the binder polymer and the carbon black is formed.

For the number of particle surface functional groups of the carbon black, the pH of carbon black that is measured according to DIN ISO 787/9 and the volatile component of carbon black that is measured according to DIN 53552 make an index. The smaller the pH value of carbon black is and also the larger the amount of its volatile component is, the more the particle surface functional groups of the carbon black are. If the carbon black has too large a number of particle surface functional groups, the points of linkage with the binder polymer may come too many on the carbon black particle surfaces, so that the elastic-material layer may have a large electrical resistance. If on the other hand the carbon black has too small a number of particle surface functional groups, the linkage between the binder polymer and the carbon black may be so weak as to be insufficiently effective in keeping any deterioration from being caused by electrification. Hence, the carbon black may preferably have a pH of from 3 to 9, and much preferably from 5 to 8. The carbon black may also preferably have a volatile component in an amount of from 0.3 wt. % to 5.0 wt. %, and much preferably from 0.5 wt. % to 2.0 wt. %.

In order to stably bring out the matrix-domain structure consisting of electronically conductive domains and an ionically conductive matrix, the viscosities and blending ratio of both the rubber materials are important. In general, where two types of non-compatible type polymers are blended, a polymer having a larger volume ratio or a lower material viscosity shows a tendency to come into the matrix.

In the present invention, the carbon black is compounded in the electronically conductive rubber material that forms the domains, and hence the material viscosity shows a tendency to come high, and, as the result, the electronically conductive rubber material can readily form the domains. In particular, where the electronically conductive rubber material is in a large blend proportion, it is preferable for the ionically conductive rubber to have a viscosity that is sufficiently lower than the electronically conductive rubber material.

Further, the ionically conductive rubber and the electronically conductive rubber material may preferably be in a blend proportion, i.e., ionically conductive rubber/electronically conductive rubber material (mass ratio), in the range of from 95/5 to 40/60. Also, in order to bring out a stable matrix-domain structure, it is further preferable that the viscosities of the both are in a viscosity difference of from 5 points or more to 60 points or less in the value of ML 1+4 at 100° C. that is found by using Mooney viscometer.

The matrix-domain structure of the conductive rubber elastic material may be confirmed by morphological observation making use of a transmission electron microscope (TEM) or a scanning electron microscope (SEM). As a specific method, a test piece is cut out of the conductive rubber elastic material, and, after this is dyed with phosphotungstic acid or dyed with osmium, observed on the electron microscope. Where the matrix-domain structure and the localization of carbon black are simultaneously observed, a method is suited in which an ultrathin slice of about 0.1 μm is prepared from the test piece having been dyed and this is observed by using the TEM.

It is desirable for the elastic-material layer of the charging member to have a uniform electrical conductivity in order to charge a charging object member uniformly and, in addition thereto, have a low hardness in order to secure its uniform contact with a photosensitive member.

In general, in order to obtain an elastic-material layer having a low hardness, a method is employed in which a plasticizer is compounded. If, however, the plasticizer is compounded in a large quantity, such a plasticizer may bloom to the surface of the elastic-material layer to contaminate the photosensitive member. In particular, the ionically conductive rubber of the matrix is a rubber having a high oil resistance and is low oil-swelling, and hence the plasticizer tends to come to bloom. However, in the present invention, the electronically conductive rubber material that forms the domains can be compounded with the plasticizer in a large quantity. Then, the plasticizer compounded in the domains is kept from blooming to the surface of the elastic-material layer, by an oil barrier effect the highly oil resistant matrix has.

Accordingly, in the present invention, even where the plasticizer is compounded in a large quantity to make the elastic-material layer have a low hardness, the photosensitive member is kept from being contaminated, as being preferable. Here, as the plasticizer, it may be exemplified by paraffin oil, naphthenic oil and aromatic oil, and such a plasticizer may be compounded in an amount in the range of from 1 part by mass or more to 100 parts by mass or less, based on 100 parts by mass of the binder polymer.

Further, to a composition used to form the elastic-material layer, a filler, a processing aid, a cross-linking auxiliary agent, a cross-linking accelerator, a cross-linking accelerator activator, a cross-linking retarder, a softening agent, a dispersant, a colorant and so forth may optionally be added which are commonly used as compounding agents for rubbers.

As methods for mixing these rubber raw materials, they may be exemplified by a mixing method making use of a closed mixing machine such as Banbury mixer or a pressure kneader and a mixing method making use of an open mixing machine such as an open roll.

As methods for forming the elastic-material layer, they may include the following methods.

Method 1

An unvulcanized rubber composition for forming the elastic-material layer, having been mixed, is extruded in the shape of a tube by means of an extruder and this extruded product is vulcanized by means of a vulcanizing pan to obtain a tube composed of vulcanized rubber. A mandrel is press-fitted into this tube and also the surface of the tube composed of vulcanized rubber is sanded to give the desired outer diameter.

Method 2

An unvulcanized rubber composition for forming the elastic-material layer, having been mixed, is co-extruded into a cylindrical shape setting a mandrel at the center, by means of an extruder fitted with a cross-head, and fixed to the interior of a mold having the desired outer diameter, followed by heating to form around the mandrel an elastic-material layer composed of vulcanized rubber.

About the above production methods, the latter method has a higher productivity and makes a lower-cost roller obtainable, but on the other hand may make the extrusion cross-head come to have a high electrical resistance at its welded joint to tend to cause peripheral non-uniformity of the electrical resistance.

In order that any dirt such as toner and paper dust can not easily stick to the surface of the elastic-material layer, the surface of the elastic-material layer may be irradiated with ultraviolet rays or electron rays so as to be subjected to surface modification. Also, a surface layer may further be formed on the surface of the elastic-material layer.

EXAMPLES

The present invention is described below in greater detail by giving working examples. In the following, "part(s)" refers to "part(s) by mass" unless particularly noted. As reagents and the like, commercially available high-purity products are used unless particularly specified.

Syntheses of Terminal-Modified Rubbers

Terminal-Modified SBR-1

The internal atmosphere of an autoclave polymerization reactor having an inner volume of 15 liters and made of stainless steel was displaced with dry nitrogen, and thereafter 200 g of styrene, 800 g of 1,3-butadiene and 7,000 g of cyclohexane were fed thereinto. Next, 18 millimoles (based on magnesium) of a dibutylmagnesium/triethyl aluminum complex (molar ratio Mg/Al=5) and 4.0 millimoles of tertiary butoxybarium were added thereto, where, with stirring of the contents, polymerization was carried out at 60° C. for 5 hours. After the polymerization was completed, 10 millimoles of 4,4'-bis(diethylamino)benzophenone [Formula (7-3)] was added as a terminal-modifying agent, and the reaction was carried out for 1 hour.

After the reaction was completed, 5 ml of methanol was added to stop the reaction, and then the polymer solution obtained was taken out into a 1.5% by mass methanol solution of 2,6-di-t-butyl-p-cresol (BHT) to allow the polymer thus formed to coaguluate. Thereafter, this polymer was dried under reduced pressure at 60° C. for 24 hours to obtain a terminal-modified styrene-butadiene copolymer (terminal-modified SBR-1).

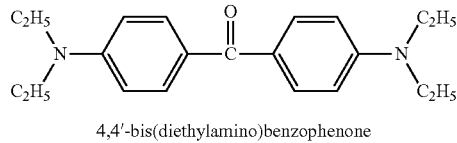

Formula (7-3)

4,4'-bis(diethylamino)benzophenone

Terminal-Modified SBR-2

A terminal-modified SBR-2 was obtained in the same way as the terminal-modified SBR-1 except that N-methyl-ε-caprolactam [Formula (8-8)] was used as the terminal-modifying agent.

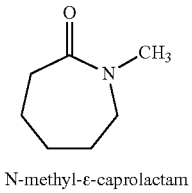

Formula (8-8)

N-methyl-ε-caprolactam

Unmodified SBR

An unmodified SBR was obtained in the same way as the terminal-modified SBR-1 except that any terminal-modifying agent was not added.

Terminal-Modified BR-1

The internal atmosphere of an autoclave polymerization reactor having an inner volume of 15 liters and made of stainless steel was displaced with dry nitrogen, and thereafter 1,000 g of 1,3-butadiene and 7,000 g of cyclohexane were fed thereinto. Next, 23 millimoles (based on magnesium) of a dibutylmagnesium/triethyl aluminum complex (molar ratio Mg/Al=5) and 5.6 millimoles of tertiary butoxybarium were added thereto, where, with stirring of the contents, polymerization was carried out at 60° C. for 5 hours.

After the polymerization reaction was completed, 10 millimoles of N-methyl-ε-caprolactam [Formula (8-8)] was added as a terminal-modifying agent, and the reaction was carried out for 1 hour. After the reaction was completed, 5 ml of methanol was added to stop the reaction, and then the polymer solution obtained was taken out into a 1.5% by mass methanol solution of 2,6-di-t-butyl-p-cresol (BHT) to allow the polymer thus formed to coaguluate. Thereafter, this polymer was dried under reduced pressure at 60° C. for hours to obtain a terminal-modified styrene-butadiene copolymer (terminal-modified BR-1).

Unmodified BR

An unmodified BR was obtained in the same way as the terminal-modified BR-1 except that any terminal-modifying agent was not added.

Terminal-Modified SBR-3

Into an autoclave reactor having an inner volume of 15 liters the internal atmosphere of which was displaced with nitrogen, 8,250 g of cyclohexane, 123.9 g of tetrahydrofuran, 375 g of styrene, 1,095 g of 1,3-butadiene and 294 mg (0.81 mmol) of potassium dodecylbenzenesulfonate were fed. After the temperature of the contents in the reactor was controlled to 20° C., 645 mg (10.08 mmol) of n-butyllithium was added thereto to initiate polymerization.

At a point in time where the polymerization conversion reached 99%, 30 g of 1,3-butadiene was added to carry out the reaction further for 5 minutes, and thereafter 3,381 mg of N,N-bis(trimethylsilyl)aminopropylmethyl-dimethoxysilane [Formula (9)] was added to carry out the reaction for 15 minutes. To the polymer solution obtained as a result of the reaction, 2,6-di-tert-butyl-p-cresol was added, followed by desolvation by steam distillation, and the polymer thus formed was allowed to coaguluate. Thereafter, this was dried under reduced pressure at 60° C. for 24 hours to obtain a terminal-modified styrene-butadiene copolymer (terminal-modified SBR-3).

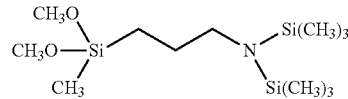

Formula (9)

Terminal-Modified SBR-4

A terminal-modified SBR-4 was obtained in the same way as the terminal-modified SBR-3 except that 1-trimethylsilyl-2,2-dimethoxy-1-aza-2-silacyclopentane [Formula (10)] was used as the terminal-modifying agent and, as a polymerization initiator, the n-butyllithium was changed for 3-[N,N-bis(trimethylsilyl)]-1-propyllithium.

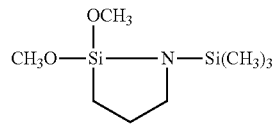

Formula (10)

Terminal-Modified SBR-5

A terminal-modified SBR-4 was obtained in the same way as the terminal-modified SBR-1 except that methyl 3-methylthiopropionate [Formula (11)] was used as the terminal-modifying agent.

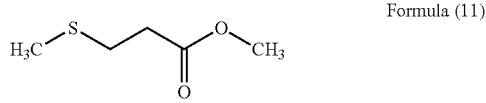

Formula (11)

Terminal-Modified SBR-6

A terminal-modified SBR-6 was obtained in the same way as the terminal-modified SBR-1 except that dimethyl 3,3'-thiodipropionate [Formula (12)] was used as the terminal-modifying agent.

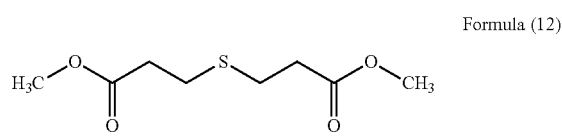

Formula (12)

Making of Carbon Master Batch

Preparation of Carbon Master Batch 1 (MB-1)

The following materials were mixed by means of a 6-liter pressure kneader (product name: TD6-15MDX; manufactured by Toshin Co., Ltd.) for 16 minutes in a packing of 80 vol. % and at a number of blade revolutions of 35 rpm to obtain a first-stage kneaded rubber composition as a carbon master batch 1.

| | |
|---|---|
| Base polymer, terminal-modified SBR-1 [SP value: 17.4 $(MPa)^{1/2}$] | 100 parts |
| Zinc stearate (trade name: ZINC STEARATE; available from NOF Corporation) | 1 part |
| Zinc oxide (trade name: ZINC WHITE CLASS 2; available from Sakai Chemical Industries Co., Ltd.) | 5 parts |
| Conductive carbon black (trade name: TOKA BLACK #5500:; available from Tokai Carbon Co., Ltd.) | 40 parts |

Preparation of Carbon Master Batch 2 (MB-2)

A carbon master batch 2 was prepared in the same way of production as the carbon master batch 1 except that the base polymer was changed for the terminal-modified SBR-2 [SP value: 17.4 $(MPa)^{1/2}$].

Preparation of Carbon Master Batch 3 (MB-3)

A carbon master batch 3 was prepared in the same way of production as the carbon master batch 1 except that the base polymer was changed for the terminal-modified SBR-3 [SP value: 17.5 $(MPa)^{1/2}$].

Preparation of Carbon Master Batch 4 (MB-4)

A carbon master batch 4 was prepared in the same way of production as the carbon master batch 1 except that the base polymer was changed for the terminal-modified SBR-4 [SP value: 17.5 $(MPa)^{1/2}$].

Preparation of Carbon Master Batch 5 (MB-5)

A carbon master batch 5 was prepared in the same way of production as the carbon master batch 1 except that the base polymer was changed for the terminal-modified SBR-5 [SP value: 17.4 $(MPa)^{1/2}$].

Preparation of Carbon Master Batch 6 (MB-6)

A carbon master batch 6 was prepared in the same way of production as the carbon master batch 1 except that the base polymer was changed for the terminal-modified SBR-6 [SP value: 17.4 $(MPa)^{1/2}$].

Preparation of Carbon Master Batch 7 (MB-7)

A carbon master batch 7 was prepared in the same way of production as the carbon master batch 1 except that 10 parts of naphthenic oil (trade name: HUKKOL NEWFLEX 2040E; available from Fujikosan Co., Ltd.) was additionally compounded as a plasticizer.

Preparation of Carbon Master Batch 8 (MB-8)

A carbon master batch 8 was prepared in the same way of production as the carbon master batch 1 except that the base polymer was changed for the terminal-modified BR-1 [SP value: 17.2 $(MPa)^{1/2}$].

Preparation of Carbon Master Batch 9 (MB-9)

A carbon master batch 9 was prepared in the same way of production as the carbon master batch 1 except that the base polymer was changed for the unmodified SBR [SP value: 17.4 $(MPa)^{1/2}$].

Preparation of Carbon Master Batch 10 (MB-10)

A carbon master batch 10 was prepared in the same way of production as the carbon master batch 1 except that the base polymer was changed for the unmodified BR [SP value: 17.2 $(MPa)^{1/2}$].

Compounding formulation of the above carbon master batches is summarized in Table 1 below.

TABLE 1

| | MB-1 | MB-2 | MB-3 | MB-4 | MB-5 | MB-6 | MB-7 | MB-8 | MB-9 | MB-10 |
|---|---|---|---|---|---|---|---|---|---|---|
| Terminal-modified SBR-1 | 100 | — | — | — | — | — | 100 | — | — | — |
| Terminal-modified SBR-2 | — | 100 | — | — | — | — | — | — | — | — |
| Terminal-modified SBR-3 | — | — | 100 | — | — | — | — | — | — | — |
| Terminal-modified SBR-4 | — | — | — | 100 | — | — | — | — | — | — |
| Terminal-modified SBR-5 | — | — | — | — | 100 | — | — | — | — | — |
| Terminal-modified SBR-6 | — | — | — | — | — | 100 | — | — | — | — |
| Terminal-modified BR-1 | — | — | — | — | — | — | — | 100 | — | — |
| Unmodified SBR | — | — | — | — | — | — | — | — | 100 | — |
| Unmodified BR | — | — | — | — | — | — | — | — | — | 100 |
| Zinc oxide | 5 | 5 | 5 | 5 | 5 | 5 | 5 | 5 | 5 | 5 |
| Zinc stearate | 1 | 1 | 1 | 1 | 1 | 1 | 1 | 1 | 1 | 1 |
| Naphthenic oil | — | — | — | — | — | — | 10 | 10 | — | 10 |
| Carbon black | 40 | 40 | 40 | 40 | 40 | 40 | 40 | 40 | 40 | 40 |

Example 1

Preparation of Unvulcanized Rubber Composition

The following materials were mixed by means of a 6-liter pressure kneader (product name: TD6-15MDX; manufactured by Toshin Co., Ltd.) for 12 minutes in a packing of 70 vol. % and at a number of blade revolutions of 30 rpm to obtain a first-stage kneaded rubber composition.

| | |
|---|---|
| Carbon master batch 1 | 43.8 parts |
| NBR [SP value: 20.3 (MPa)$^{1/2}$] | 70 parts |
| (trade name: N230SV, available from JSR Corporation) | |
| Zinc stearate | 0.7 part |
| (trade name: ZINC STEARATE; available from NOF Corporation) | |
| Zinc oxide | 3.5 parts |
| (trade name: ZINC WHITE CLASS 2; available from Sakai Chemical Industries Co., Ltd.) | |
| Calcium carbonate | 20 parts |
| (trade name: SILVER W; available from Shiraishi Kogyo Kaisha, Ltd.). | |

Into 138 parts of this first-stage kneaded rubber composition, the following materials were mixed by means of an open roll of 12 inches in roll diameter, for 20 minutes at a number of front-roll revolutions of 8 rpm and a number of back-roll revolutions of 10 rpm and at a roll gap of 2 mm to obtain an unvulcanized rubber composition for elastic-material layer.

| | |
|---|---|
| Sulfur | 1.2 parts |
| (trade name: SULFAX PMC; available from Tsurumi Kagaku Kogyo K.K.) | |
| Vulcanization accelerator, tetramethylammonium mono-sulfide (trade name: NOCCELLER TBzTD; available from Ohuchi-Shinko Chemical Industrial Co., Ltd.) | 1 part |
| Vulcanization accelerator, N-t-butyl-2-benzothiazole sulfenimide (trade name: SUNTOCURE-TBSI; available from FLEXSYS) | 1 part |

Production of Charging Roller

A columnar conductive mandrel (made of steel and plated with nickel on its surface) of 6 mm in diameter and 252 mm in length was coated with a conductive vulcanization adhesive (trade name: METALOC U-20; available from Toyokagaku Kenkyusho Co., Ltd.) over the column surface on its middle portion of 226 mm in axial direction, followed by drying at 80° C. for 30 minutes.

Next, the above unvulcanized rubber composition was extruded together with the mandrel while being shaped coaxially around the mandrel and in the shape of a cylinder, by means of an extrusion equipment making use of a cross head to produce an unvulcanized rubber roller of 8.8 mm in diameter which was coated with the unvulcanized rubber composition on the outer periphery of the mandrel. As an extruder, an extruder having a cylinder diameter of 45 mm and an L/D of 20 was used, making temperature control to 90° C. for a head, 90° C. for a cylinder and 90° C. for a screw at the time of extrusion.

The unvulcanized rubber roller thus shaped was so cut at both end portions of its elastic-material layer portion as to make that portion be 228 mm in width in the axial direction. Thereafter, this was treated by heating at 160° C. for 40 minutes by means of an electric furnace to obtain a vulcanized rubber layer. The vulcanized rubber layer was then sanded on its surface by means of a sander of a plunge-cut grinding system to obtain a rubber roller having an elastic-material layer with a crown shape of 8.35 mm in end-portion diameter and 8.50 mm in middle-portion diameter.

The rubber roller obtained was irradiated with ultraviolet (UV) rays on its surface to carry out surface treatment to obtain a charging roller. In the irradiation with the ultraviolet rays, a low-pressure mercury lamp manufactured by Harison Toshiba Lighting Corporation was used, and the surface was irradiated with ultraviolet rays of 254 nm in wavelength in such a way that the integrated amount of light came to 15,000 mJ/cm$^2$. Here, it was irradiated with the ultraviolet rays while rotating the roller at a speed of 60 rpm by means of a roller rotating member. The integral light quantity of ultraviolet radiation is defined as shown below.

Ultraviolet radiation integral light quantity(mJ/cm$^2$)= ultraviolet radiation intensity(mW/cm$^2$)×irradiation time($s$).

The integral light quantity of ultraviolet radiation may be controlled by selecting irradiation time, lamp output, distance between the lamp and the irradiation object, and so forth, and was measured with an ultraviolet radiation integral light quantity meter UIT-150-A, manufactured by Ushio Inc.

Confirmation of Matrix and Domains in Elastic-Material Layer

The presence of matrix and domains in the elastic-material layer of the charging roller obtained was confirmed in the following way.

That is, a slice of the elastic-material layer, having a thickness of 1 mm, was cut from the charging roller. This slice was immersed in an aqueous 5% phosphotungstic acid solution for 15 minutes, and then this slice was taken out of the aqueous 15% phosphotungstic acid solution, followed by washing with pure water and further drying at room temperature (25° C.). From the slice thus obtained and having been dyed, a sample for observation with electron microscopes which was 0.1 μm in thickness was prepared by using an electron microscope's sample preparing instrument (trade name: Ultramicrotome Leica EM UC7, manufactured by Leica Microsystems GmbH). This sample was observed with use of a transmission electron microscope (trade name: H-7500; manufactured by Hitachi Ltd.) to confirm whether or not the matrix-domain structure was present.

As the result, it was able to confirm that the elastic-material layer according to this Example had the matrix-domain structure.

Figure 4:
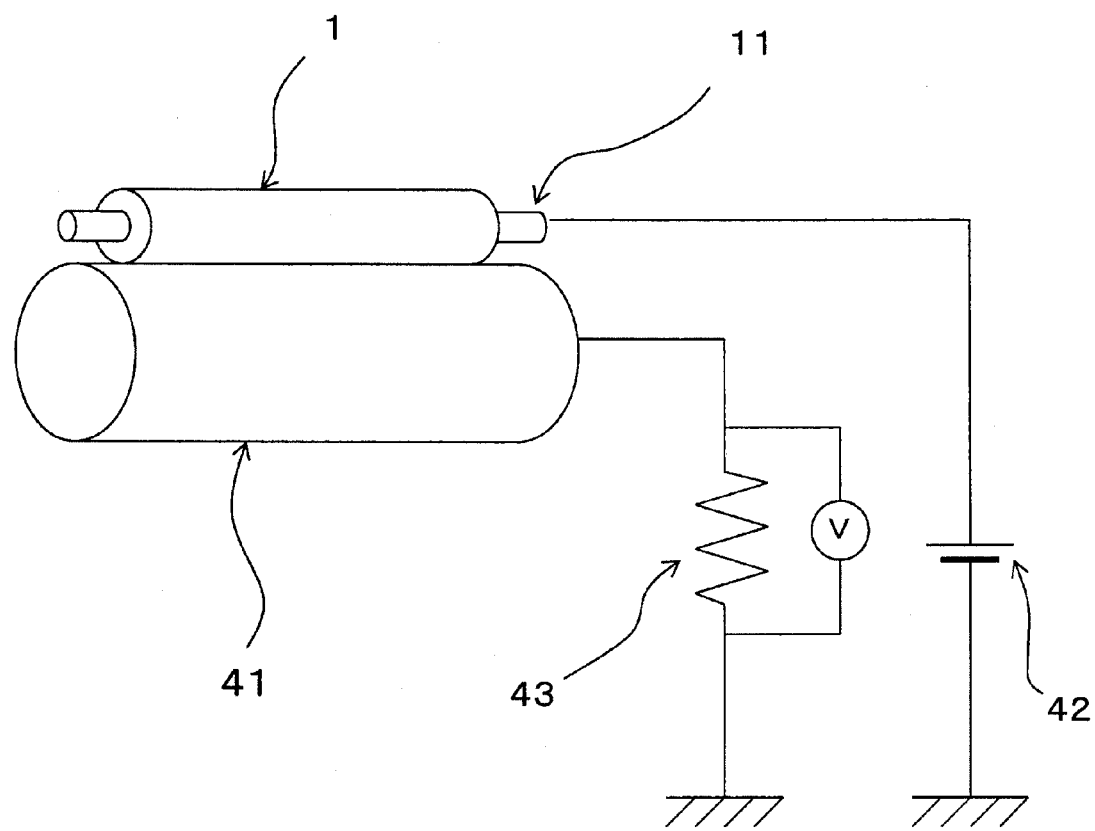
FIG. 4 is a schematic view showing the construction of an instrument with which the electrical resistance of a charging roller is measured.

Measurement of electrical resistance, non-uniformity of electrical resistance in peripheral direction, environmental dependence, and voltage dependence FIG. 4 schematically shows the construction of an instrument with which the electrical resistance of a charging roller is measured. A charging roller 1 is kept pressed against a cylindrical aluminum drum 41 of 30 mm in diameter under application of pressure at both end portions of a mandrel 11 by means of a press-down means (not shown), and is follow-up rotated as the aluminum drum 41 is rotatingly driven. In this state, a DC voltage is applied to the part of the mandrel 11 of the charging roller 1 by the use of an external power source 42, where the voltage applied to a standard resistance 43 connected to the aluminum drum 41 in series is measured. The electrical resistance of the charging roller 1 may be calculated from the voltage of the standard resistance 43 and according to the following equation.

$$R = V_1 \cdot R_b / V_m$$

(R is the roller electrical resistance, $V_1$ is the applied voltage, $R_b$ is the standard resistance value, and $V_m$ is the standard resistance voltage measured.)

The electrical resistance of the charging roller was measured under application of a DC voltage of 200 V across the mandrel and the aluminum drum for 2 seconds in an environment of temperature 23° C./humidity 50% RH (also noted as NN) and using the instrument shown in FIG. 4. In this measurement, the number of revolutions of the aluminum drum was set at 30 rpm, and the resistance value of the standard resistance was so controlled as to be 1/100 of the roller resistance. Data were sampled at a frequency of 100 Hz at intervals of 1 second after 1 second lapsed after the voltage was applied, and an average value of the electrical resistance values obtained was taken as the resistance value of the charging roller. The ratio of the maximum value to the minimum value of the electrical resistance values of the charging roller, thus measured, was calculated as the non-uniformity of electrical resistance in peripheral direction (peripheral non-uniformity) of the charging roller.

The above measurement was made under applied voltage which was changed to a DC 20 V, and the difference in common logarithm of electrical resistance value between the application of DC 20 V and the application of DC 200 V was taken as the voltage dependence.

Further, the measurement of electrical resistance value found when the DC 200 V was applied was also made in an environment of temperature 15° C./humidity 10% RH (also noted as LL) and in an environment of temperature 30° C./humidity 80% RH (also noted as HH). Then, the difference in common logarithm of the electrical resistance value of the charging roller between that measured in the LL environment and that measured in the HH environment was calculated as the environmental dependence of electrical resistance of the charging roller.

As the result, it was found that the peripheral non-uniformity of electrical resistance was 1.20 times, the voltage dependence was on the order of 0.88 and the environmental dependence was on the order of 0.10.

Measurement of MD-1 Hardness

MD-1 hardness of the charging roller was measured. It was measured with a microhardness meter (trade name: MD-1 Model; manufactured by Koubunshi Keiki Co., Ltd.), and was measured in a peak hold mode in an environment of temperature 23° C./humidity 55% RH. Stated more specifically, a rubber roller (the charging roller) was placed on a plate made of a metal, and a block made of a metal was placed to simply fasten the charging roller so as not to roll over, where a measuring terminal was pressed against the metal plate accurately at the center of the rubber roller in the vertical direction, where a peak value after 5 seconds was read. This was measured at both end portions positioned 30 to 40 mm away from rubber ends of the roller and the middle portion thereof and at 3 spots each of these in the peripheral direction, i.e., at 9 spots in total. An average value of the measured values obtained was taken as the hardness of the elastic-material layer. As the result, the elastic-material layer was found to have a hardness of 52°.

Example 2

A charging roller was produced in the same way as Example 1 except that, in preparing the unvulcanized rubber composition in Example 1, the carbon master batch used was changed for the carbon master batch 2.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.22 times, the voltage dependence was on the order of 0.86 and the environmental dependence was on the order of 0.09. The MD-1 hardness was also measured in the same way as Example 1 to find that it was 52°.

Example 3

A charging roller was produced in the same way as Example 1 except that, in preparing the unvulcanized rubber composition in Example 1, the first-stage kneaded rubber composition was formulated as shown below.

| | |
|---|---|
| Carbon master batch 3 | 36.5 parts |
| NBR | 75 parts |
| (trade name: N230SV, available from JSR Corporation] | |
| Zinc stearate | 0.75 part |
| (trade name: ZINC STEARATE; available from NOF Corporation) | |
| Zinc oxide | 3.75 parts |
| (trade name: ZINC WHITE CLASS 2; available from Sakai Chemical Industries Co., Ltd.) | |
| Calcium carbonate | 20 parts |
| (trade name: SILVER W; available from Shiraishi Kogyo Kaisha, Ltd.). | |

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.31 times, the voltage dependence was on the order of 1.03 and the environmental dependence was on the order of 0.13. The MD-1 hardness was also measured in the same way as Example 1 to find that it was 49°.

Example 4

A charging roller was produced in the same way as Example 3 except that, in preparing the unvulcanized rubber composition in Example 3, the carbon master batch used was changed for the carbon master batch 4.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.72 times, the voltage dependence was on the order of 1.09 and the environmental dependence was on the order of 0.15. The MD-1 hardness was also measured in the same way as Example 1 to find that it was 50°.

Example 5

A charging roller was produced in the same way as Example 3 except that, in preparing the unvulcanized rubber composition in Example 3, the carbon master batch used was changed for the carbon master batch 5.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.65 times, the voltage dependence was on the order of 1.15 and the environmental dependence was on the order of 0.12. The MD-1 hardness was also measured in the same way as Example 1 to find that it was 49°.

Example 6

A charging roller was produced in the same way as Example 3 except that, in preparing the unvulcanized rubber composition in Example 3, the carbon master batch used was changed for the carbon master batch 6.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.84 times, the voltage dependence was on the order of 1.10 and the environmental dependence was on the order of 0.13. The MD-1 hardness was also measured in the same way as Example 1 to find that it was 50°.

Example 7

A charging roller was produced in the same way as Example 1 except that, in preparing the unvulcanized rubber composition in Example 1, the carbon master batch used was changed for the carbon master batch 7 and this was compounded in an amount of 46.8 parts.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.25 times, the voltage dependence was on the order of 0.93 and the environmental dependence was on the order of 0.09. The MD-1 hardness was also measured in the same way as Example 1 to find that it was 48°.

Example 8

A charging roller was produced in the same way as Example 3 except that, in preparing the unvulcanized rubber composition in Example 3, the carbon master batch used was changed for the carbon master batch 7 and this was compounded in an amount of 39.0 parts.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.23 times, the voltage dependence was on the order of 0.87 and the environmental dependence was on the order of 0.08. The MD-1 hardness was also measured in the same way as Example 1 to find that it was 47°.

Example 9

A charging roller was produced in the same way as Example 8 except that, in preparing the unvulcanized rubber composition in Example 8, the carbon master batch used was changed for the carbon master batch 8.

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.26 times, the voltage dependence was on the order of 0.89 and the environmental dependence was on the order of 0.08. The MD-1 hardness was also measured in the same way as Example 1 to find that it was 46°.

Example 10

A charging roller was produced in the same way as Example 1 except that, in preparing the unvulcanized rubber composition in Example 1, the first-stage kneaded rubber composition was formulated as shown below.

| | |
|---|---|
| Carbon master batch 1 | 29.2 parts |
| Epichlorohydrin-ethylene oxide-ally diglycidyl ether rubber [SP value: 18.5 (MPa)$^{1/2}$] (trade name: EPICHLOMER CG105; available from Daiso Co., Ltd.) | 80 parts |
| Zinc stearate (trade name: ZINC STEARATE; available from NOF Corporation) | 0.80 part |
| Zinc oxide (trade name: ZINC WHITE CLASS 2; available from Sakai Chemical Industries Co., Ltd.) | 4.0 parts |
| Calcium carbonate (trade name: SILVER W; available from Shiraishi Kogyo Kaisha, Ltd.). | 40 parts |
| MT carbon for coloring (trade name: THERMAX FLOFORM N990; available from Cancab Technologies Ltd.) | 5 parts |

In the same way as Example 1, it was confirmed that the elastic-material layer had the matrix-domain structure.

The electrical resistance of the roller was also evaluated in the same way as Example 1 to find that the peripheral non-uniformity of electrical resistance was 1.16 times, the voltage dependence was on the order of 0.82 and the environmental dependence was on the order of 0.25. The MD-1 hardness was also measured in the same way as Example 1 to find that it was 53°.

Comparative Example 1

A charging roller was produced in the same way as Example 3 except that, in preparing the unvulcanized rubber composition in Example 3, the carbon master batch used was changed for the carbon master batch 9.

In the same way as Example 1, it was confirmed that the elastic-material layer had the matrix-domain structure.

The electrical resistance of the roller was also evaluated in the same way as Example 1 to find that the peripheral non-uniformity of electrical resistance was 2.20 times, the voltage dependence was on the order of 1.46 and the environmental dependence was on the order of 0.48. The MD-1 hardness was also measured in the same way as Example 1 to find that it was 51°.

Comparative Example 2

A charging roller was produced in the same way as Example 9 except that, in preparing the unvulcanized rubber composition in Example 9, the carbon master batch used was changed for the carbon master batch 10.

In the same way as Example 1, it was confirmed that the elastic-material layer had the matrix-domain structure.

The electrical resistance of the roller was also evaluated in the same way as Example 1 to find that the peripheral non-uniformity of electrical resistance was 2.40 times, the voltage dependence was on the order of 1.49 and the environmental dependence was on the order of 0.42. The MD-1 hardness was also measured in the same way as Example 1 to find that it was 49°.

Comparative Example 3

A charging roller was produced in the same way as Example 1 except that, in preparing the unvulcanized rubber composition in Example 1, the first-stage kneaded rubber composition was formulated as shown below.

| | |
|---|---|
| NBR (trade name: N230SV, available from JSR Corporation] | 100 parts |
| Zinc stearate (trade name: ZINC STEARATE; available from NOF Corporation) | 1.00 part |
| Zinc oxide (trade name: ZINC WHITE CLASS 2; available from Sakai Chemical Industries Co., Ltd.) | 5.00 parts |
| Calcium carbonate (trade name: SILVER W; available from Shiraishi Kogyo Kaisha, Ltd.). | 20 parts |
| Conductive carbon black (trade name: TOKA BLACK #5500:; available from Tokai Carbon Co., Ltd.) | 26 parts |

The elastic-material layer was electron-microscopically observed in the same way as Example 1, but any matrix-domain structure was not seen.

The electrical resistance of the roller was also evaluated in the same way as Example 1 to find that the peripheral non-uniformity of electrical resistance was 3.40 times, the voltage dependence was on the order of 2.04 and the environmental dependence was on the order of 0.05. The MD-1 hardness was also measured in the same way as Example 1 to find that it was 65°.

Comparative Example 4

A charging roller was produced in the same way as Example 1 except that, in preparing the unvulcanized rubber composition in Example 1, the first-stage kneaded rubber composition was formulated as shown below.

| | |
|---|---|
| Epichlorohydrin-ethylene oxide-ally diglycidyl ether rubber (trade name: EPICHLOMER CG105; available from Daiso Co., Ltd.) | 100 parts |
| Zinc stearate (trade name: ZINC STEARATE; available from NOF Corporation) | 1.00 part |
| Zinc oxide (trade name: ZINC WHITE CLASS 2; available from Sakai Chemical Industries Co., Ltd.) | 5.00 parts |
| Calcium carbonate (trade name: SILVER W; available from Shiraishi Kogyo Kaisha, Ltd.). | 45 parts |
| Ionic conduction agent, lithium trifluoromethane sulfonate | 1 part |
| MT carbon for coloring (trade name: THERMAX FLOFORM N990; available from Cancab Technologies Ltd.) | 5 parts |

The elastic-material layer was electron-microscopically observed in the same way as Example 1, but any matrix-domain structure was not seen.

The electrical resistance of the roller was also evaluated in the same way as Example 1 to find that the peripheral non-uniformity of electrical resistance was 1.05 times, the voltage dependence was on the order of 0.18 and the environmental dependence was on the order of 1.20. The MD-1 hardness was also measured in the same way as Example 1 to find that it was 55°.

Compounding materials for the elastic-material layers according to Examples and Comparative Examples are shown in Tables 2 and 3, respectively. The results of evaluation of the charging rollers according to Examples are also shown in Table 4, and the results of evaluation of the charging rollers according to Comparative Examples in Table 5.

TABLE 2

| | Examples | | | | | | | | | |
|---|---|---|---|---|---|---|---|---|---|---|
| | 1 | 2 | 3 | 4 | 5 | 6 | 7 | 8 | 9 | 10 |
| Compounding materials: | [part(s) by mass] | | | | | | | | | |
| MB-1 | 43.8 | — | — | — | — | — | — | — | — | 29.2 |
| MB-2 | — | 43.8 | — | — | — | — | — | — | — | — |
| MB-3 | — | — | 36.5 | — | — | — | — | — | — | — |
| MB-4 | — | — | — | 36.5 | — | — | — | — | — | — |
| MB-5 | — | — | — | — | 36.5 | — | — | — | — | — |
| MB-6 | — | — | — | — | — | 36.5 | — | — | — | — |
| MB-7 | — | — | — | — | — | — | 46.8 | 39.0 | — | — |
| MB-8 | — | — | — | — | — | — | — | — | 39.0 | — |
| NBR | 70 | 70 | 75 | 75 | 75 | 75 | 70 | 75 | 75 | — |
| Epichlorohydrin rubber | — | — | — | — | — | — | — | — | — | 80 |
| Zinc oxide | 3.50 | 3.50 | 3.75 | 3.75 | 3.75 | 3.75 | 3.50 | 3.75 | 3.75 | 4.00 |
| Zinc stearate | 0.70 | 0.70 | 0.75 | 0.75 | 0.75 | 0.75 | 0.70 | 0.75 | 0.75 | 0.80 |
| Calcium carbonate | 20 | 20 | 20 | 20 | 20 | 20 | 20 | 20 | 20 | 40 |
| MT carbon | — | — | — | — | — | — | — | — | — | 5 |
| Sulfur | 1.20 | 1.20 | 1.20 | 1.20 | 1.20 | 1.20 | 1.20 | 1.20 | 1.20 | 1.20 |
| Vulcanization accelerator TBzTD | 1.00 | 1.00 | 1.00 | 1.00 | 1.00 | 1.00 | 1.00 | 1.00 | 1.00 | 1.00 |
| Vulcanization accelerator TBSI | 1.00 | 1.00 | 1.00 | 1.00 | 1.00 | 1.00 | 1.00 | 1.00 | 1.00 | 1.00 |

TABLE 3

| | Comparative Examples | | | |
|---|---|---|---|---|
| | 1 | 2 | 3 | 4 |
| Compounding materials: | [part(s) by mass] | | | |
| MB-9 | 36.5 | — | — | — |
| MB-10 | — | 39.0 | — | — |
| NBR | 75 | 75 | 100 | — |
| Epichlorohydrin rubber | — | — | — | 100 |
| Zinc oxide | 3.75 | 3.75 | 5.00 | 5.00 |
| Zinc stearate | 0.75 | 0.75 | 1.00 | 1.00 |
| Carbon black | — | — | 26 | — |
| Calcium carbonate | 20 | 20 | 20 | 45 |
| Ionic conduction agent | — | — | — | 1 |
| MT carbon | — | — | — | 5 |
| Sulfur | 1.20 | 1.20 | 1.20 | 1.20 |
| Vulcanization accelerator TBzTD | 1.00 | 1.00 | 1.00 | 1.00 |
| Vulcanization accelerator TBSI | 1.00 | 1.00 | 1.00 | 1.00 |

TABLE 4

| Evaluation results: | Examples | | | | | | | | | |
|---|---|---|---|---|---|---|---|---|---|---|
| | 1 | 2 | 3 | 4 | 5 | 6 | 7 | 8 | 9 | 10 |
| Matrix-domain structure | present | present | present | present | present | present | present | present | present | present |
| Electrical resistance in NN environment (20 V) (Ω) | 2.45E+05 | 2.68E+05 | 1.43E+06 | 1.12E+06 | 9.35E+05 | 5.86E+05 | 2.10E+05 | 5.70E+05 | 4.44E+05 | 3.22E+05 |
| Electrical resistance in NN environment (200 V) (Ω) | 3.23E+04 | 3.70E+04 | 1.33E+05 | 9.09E+04 | 6.62E+04 | 4.65E+04 | 2.47E+04 | 7.69E+04 | 5.71E+04 | 4.88E+04 |
| Peripheral non-uniformity (200 V) (times) | 1.20 | 1.22 | 1.31 | 1.72 | 1.65 | 1.84 | 1.25 | 1.23 | 1.26 | 1.16 |
| Electrical resistance in LL environment (200 V) (Ω) | 3.70E+04 | 4.17E+04 | 1.54E+05 | 1.11E+05 | 7.69E+04 | 5.56E+04 | 2.82E+04 | 8.70E+04 | 6.25E+04 | 6.90E+04 |
| Electrical resistance in HH environment (200 V) (Ω) | 2.94E+04 | 3.39E+04 | 1.14E+05 | 7.87E+04 | 5.84E+04 | 4.12E+04 | 2.29E+04 | 7.23E+04 | 5.20E+04 | 3.88E+04 |
| Voltage dependence (order) | 0.88 | 0.86 | 1.03 | 1.09 | 1.15 | 1.10 | 0.93 | 0.87 | 0.89 | 0.82 |
| Environmental dependence (order) | 0.10 | 0.09 | 0.13 | 0.15 | 0.12 | 0.13 | 0.09 | 0.08 | 0.08 | 0.25 |
| MD-1 hardness (°) | 52 | 52 | 49 | 50 | 49 | 50 | 48 | 47 | 46 | 53 |

TABLE 5

| Evaluation results: | Comparative Examples | | | |
|---|---|---|---|---|
| | 1 | 2 | 3 | 4 |
| Matrix-domain structure | present | present | absent | absent |
| Electrical resistance in NN environment (20 V) (Ω) | 1.60E+06 | 1.93E+06 | 2.24E+06 | 3.78E+05 |
| Electrical resistance in NN environment (200 V) (Ω) | 5.56E+04 | 6.25E+04 | 2.04E+04 | 2.50E+05 |
| Peripheral non-uniformity (200 V) (times) | 2.20 | 2.40 | 3.40 | 1.05 |
| Electrical resistance in LL environment (200 V) (Ω) | 1.05E+05 | 1.11E+05 | 2.17E+04 | 1.33E+06 |
| Electrical resistance in HH environment (200 V) (Ω) | 3.49E+04 | 4.22E+04 | 1.94E+04 | 8.41E+04 |
| Voltage dependence (order) | 1.46 | 1.49 | 2.04 | 0.18 |
| Environmental dependence (order) | 0.48 | 0.42 | 0.05 | 1.20 |
| MD-1 hardness (°) | 51 | 49 | 65 | 55 |

The peripheral non-uniformity of electrical resistance comes from a high electrical resistance portion corresponding to the welded joint of the extrusion cross-head at the time of production, and may cause faulty images with horizontal lines that follow the rotational pitches of the charging roller especially when the roller has a great electrical resistance. In order to keep such faulty images from occurring, the non-uniformity of electrical resistance in peripheral direction may preferably be 2 times or less.

The charging uniformity of the charging roller shows a better tendency as the electrical resistance is the smaller when a low voltage is applied. On the other hand, if the electrical resistance is smaller on the high-voltage side, leaks tend to come at any defective areas of the surface of a photosensitive member. Accordingly, it is more preferable for the voltage dependence of electrical resistance to be smaller, and the difference in electrical resistance between the application of 20 V and the application of 200 V may preferably be on the order of less than 1.40.

Similarly, from the viewpoint of charging uniformity in the LL environment and prevention of leaks in the HH environment, it is also more preferable for the environmental dependence of electrical resistance to be smaller, and the environmental dependence between LL and HH may preferably be on the order of less than 0.4.

Comparative Example 3 is a charging roller making use of an electronically conductive rubber material not having any matrix-domain structure, and has a great peripheral non-uniformity of electrical resistance and a great voltage dependence. Comparative Example 4 is a charging roller making use of an ionically conductive rubber material not having any matrix-domain structure, and has a great environmental dependence of electrical resistance. In Comparative Examples 1 and 2, any terminal-modified rubber is not used, and hence the peripheral non-uniformity of electrical resistance is 2 times or more, the voltage dependence is on the order of 1.40 or more and the environmental dependence is on the order of 0.40 or more. In contrast thereto, in Examples 1 to 10, the peripheral non-uniformity of electrical resistance is less than 2.0 times, the voltage dependence is on the order of less than 1.40 and the environmental dependence is on the order of less than 0.40.

REFERENCE SIGNS LIST 1 charging roller;
11 mandrel;
12 elastic-material layer;
13 surface layer;
21 electrophotographic photosensitive member;
21a photosensitive layer;
21b support;
21c shaft;
23 power source;
23a rubbing-friction electrode;
24 exposure means;
25 developing means;
26 transfer means;
27 transfer material;
28 pre-exposure means;
29 cleaning means;
31 matrix;
32 domain;
41 aluminum drum;
42 external power source; and
43 standard resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-010891, filed Jan. 21, 2011, which is hereby incorporated by reference herein in its entirety.

What is claimed is:

1. A conductive rubber elastic material comprising:
a matrix containing at least one ionically conductive rubber selected from the group consisting of epichlorohydrin rubber, epichlorohydrin-ethylene oxide rubber, epichlorohydrin-ethylene oxide-allyl glycidyl ether rubber, acrylonitrile-butadiene rubber and a hydrogenated product of acrylonitrile-butadiene rubber;
and domains composed of an electronically conductive rubber material containing i) a rubber having a butadiene skeleton and ii) carbon black, where;
the rubber having a butadiene skeleton is modified at a molecular terminal thereof with at least one atomic group selected from the group consisting of atomic groups represented by the following formula (1) to (6):

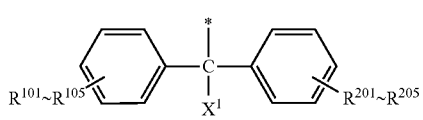

Formula (1)

wherein an asterisk * represents the position of bonding with a terminal carbon atom the rubber having a butadiene skeleton has, $X^1$ represents OH or SH, and $R^{101}$ to $R^{105}$ and $R^{201}$ to $R^{205}$ each independently represent a hydrogen atom or a monovalent substituent;

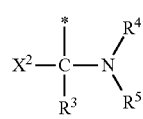

Formula (2)

wherein an asterisk * represents the position of bonding with a terminal carbon atom the rubber having a butadiene skeleton has, $X^2$ represents OH or SH, $R^4$ represents a hydrogen atom or a monovalent substituent, and $R^3$ and $R^5$ represent hydrocarbon chains necessary to combine with each other to form a nitrogen-containing 4- to 6-membered ring together with the carbon atom and nitrogen atom in the formula-(2) atomic group or each independently represent a hydrogen atom or a monovalent substituent;

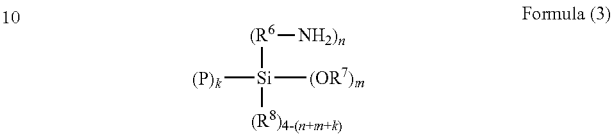

Formula (3)

wherein P represents the main chain of the rubber having a butadiene skeleton; $R^6$ is an alkylene group having 1 to 12 carbon atom(s); $R^7$ and $R^8$ are each independently an alkyl group having 1 to 20 carbon atom(s); and n is an integer of 1 or 2, m is an integer of 1 or 2 and k is an integer of 1 or 2, provided that n+m+k is an integer of 3 or 4;

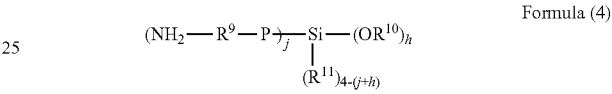

Formula (4)

wherein P represents the main chain of the rubber having a butadiene skeleton, $R^9$ is an alkylene group having 1 to 12 carbon atom(s); $R^{10}$ and $R^{11}$ are each independently an alkyl group having 1 to 20 carbon atom(s); and j is an integer of 1 to 3 and h is an integer of 1 to 3, provided that j+h is an integer of 2 to 4;

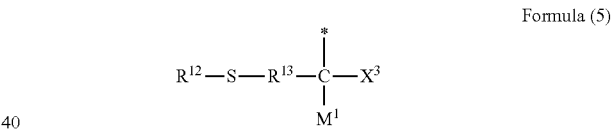

Formula (5)

wherein an asterisk * represents the position of bonding with a terminal carbon atom the rubber having a butadiene skeleton has, $R^{12}$ represents an alkyl group having 1 to 18 carbon atom(s), $R^{13}$ represents an alkylene group having 1 to 6 carbon atom(s), $X^3$ represents OH or SH, and $M^1$ represents an alkyl group having 1 to 18 carbon atom(s) or an alkoxyl group having 1 to 18 carbon atom(s); and

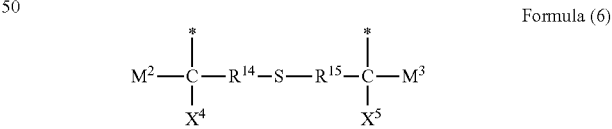

Formula (6)

wherein asterisks *'s each represent the position of bonding with a terminal carbon atom the rubber having a butadiene skeleton has, $R^{14}$ and $R^{15}$ each independently represent an alkylene group having 1 to 6 carbon atom(s), $X^4$ and $X^5$ each independently represent OH or SH, and $M^2$ and $M^3$ each independently represent an alkyl group having 1 to 18 carbon atom(s) or an alkoxyl group having 1 to 18 carbon atom(s).

2. The conductive rubber elastic material according to claim 1, wherein the atomic group represented by the formula (1) is an atomic group represented by the following formula (7) or the atomic group represented by the formula (2) is an atomic group represented by the following formula (8):

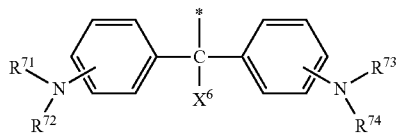

Formula (7)

wherein an asterisk * represents the position of bonding with a terminal carbon atom the rubber having a butadiene skeleton has, $R^{71}$ to $R^{74}$ each independently represent a hydrogen atom or an alkyl group having 1 to 4 carbon atom(s), and $X^6$ represents OH or SH; or

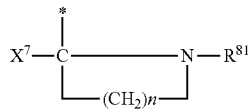

Formula (8)

wherein an asterisk * represents the position of bonding with a terminal carbon atom the rubber having a butadiene skeleton has; $X^7$ represents OH or SH, $R^{81}$ represents a hydrogen atom, an alkyl group having 1 to 6 carbon atom(s) or a phenyl group; and n represents an integer of 2 to 6.

3. The conductive rubber elastic material according to claim 1, wherein the difference in SP value between the ionically conductive rubber and the rubber having a butadiene skeleton is 1.0 $(MPa)^{1/2}$ or more.

4. The conductive rubber elastic material according to claim 1, wherein the rubber having a butadiene skeleton is polybutadiene rubber or styrene-butadiene rubber.

5. A charging member comprising an electrically conductive support and an elastic-material layer;
   Wherein, the elastic-material layer comprises the conductive rubber elastic material according to claim 1.

6. An electrophotographic apparatus comprising the charging member according to claim 5 and an electrophotographic photosensitive member to be electrostatically charged by the charging member.

* * * * *